US009967399B2

(12) United States Patent
Khalatian et al.

(10) Patent No.: US 9,967,399 B2
(45) Date of Patent: May 8, 2018

(54) CO-BROWSING PREVIEW OF QUEUED CUSTOMER CONTACTS

(71) Applicant: ORACLE INTERNATIONAL CORPORATION, Redwood Shores, CA (US)

(72) Inventors: Igor Khalatian, Morganville, NJ (US); Albert Manukyan, Yerevan (AM); Hayk Baghdasaryan, Yerevan (AM)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days. days.

(21) Appl. No.: 14/851,268

(22) Filed: Sep. 11, 2015

(65) Prior Publication Data
US 2016/0182721 A1 Jun. 23, 2016

Related U.S. Application Data

(60) Provisional application No. 62/094,276, filed on Dec. 19, 2014.

(51) Int. Cl.
*H04M 3/00* (2006.01)
*H04M 3/51* (2006.01)
(Continued)

(52) U.S. Cl.
CPC ...... *H04M 3/5191* (2013.01); *H04L 41/5064* (2013.01); *H04L 65/1069* (2013.01);
(Continued)

(58) Field of Classification Search
CPC .......... G06C 30/016; G06C 10/063112; G06C 10/063114; G06C 10/025; G06C 50/14;
(Continued)

(56) References Cited

U.S. PATENT DOCUMENTS 5,107,443 A 4/1992 Smith et al.
5,515,491 A 5/1996 Bates et al.
(Continued)

FOREIGN PATENT DOCUMENTS

WO 2008008806 1/2008
WO 2008-008806 10/2008

OTHER PUBLICATIONS

U.S. Appl. No. 13/762,725, Final Office Action dated Sep. 27, 2016, 32 pages.
(Continued)

*Primary Examiner* — Ahmad F Matar
*Assistant Examiner* — Kharye Pope
(74) *Attorney, Agent, or Firm* — Kilpatrick Townsend & Stockton LLP

(57) ABSTRACT

Embodiments of the invention provide systems and methods for providing a co-browsing preview of a queued contact. According to one embodiment, providing a co-browsing preview of a queued contact can comprise receiving a contact from a customer, selecting an agent from a plurality of agents based at least in part on the contact and a defined set of skills for each of the agents, and assigning the contact to the selected agent. Assigning the contact to the selected agent can comprise placing the contact into a queue for the selected agent. A live, real-time co-browsing preview of a current user interface of the customer can be provided to the selected agent while the contact is assigned to the selected agent's queue and before the customer is connected to the selected agent.

20 Claims, 32 Drawing Sheets

(51) Int. Cl.
  *H04L 29/06* (2006.01)
  *H04M 7/00* (2006.01)
  *H04M 3/523* (2006.01)
  *H04L 12/24* (2006.01)
  *H04L 12/66* (2006.01)
(52) U.S. Cl.
  CPC .......... *H04L 65/60* (2013.01); *H04M 3/5233* (2013.01); *H04M 7/0033* (2013.01); *H04M 7/0042* (2013.01)
(58) Field of Classification Search
  CPC ..... G06C 10/101; G06C 10/103; H04M 3/51; H04M 3/5183; H04M 3/523; H04M 3/5175; H04M 3/5233; H04M 3/5191; H04M 3/5232; H04M 1/72522; H04M 2201/42; H04M 3/42161; H04L 41/22; H04L 41/5061
  USPC ............ 379/265.09, 265.12, 265.11, 265.02, 379/266.01, 265.01; 705/304, 7.14
  See application file for complete search history.

(56) References Cited

U.S. PATENT DOCUMENTS

| | | |
|---|---|---|
| 5,838,906 A | 11/1998 | Doyle et al. |
| 5,872,923 A | 2/1999 | Schwartz et al. |
| 5,884,014 A | 3/1999 | Huttenlocher et al. |
| 5,960,411 A | 9/1999 | Hartman et al. |
| 6,308,199 B1 | 10/2001 | Katsurabayashi |
| 6,331,855 B1 | 12/2001 | Schauser |
| 6,396,520 B1 | 5/2002 | Ording |
| 6,442,590 B1 | 8/2002 | Inala et al. |
| 6,460,081 B1 | 10/2002 | Doherty et al. |
| 6,717,607 B1 | 4/2004 | Lauper et al. |
| 6,785,708 B1 | 8/2004 | Busey et al. |
| 7,149,776 B1 | 12/2006 | Roy et al. |
| 7,185,056 B2 | 2/2007 | Fujisawa et al. |
| 7,263,526 B1 | 8/2007 | Busey et al. |
| 7,343,567 B2 | 3/2008 | Mann et al. |
| 7,933,955 B2 | 4/2011 | Khalatian |
| 8,046,259 B1 | 10/2011 | Siegel et al. |
| 8,117,560 B1 | 2/2012 | Lu et al. |
| 8,495,660 B1 | 7/2013 | Hernacki |
| 8,788,949 B2 | 7/2014 | Hunt et al. |
| 8,842,156 B1 * | 9/2014 | Alekhin ................ G06Q 10/10 348/14.01 |
| 9,313,332 B1 * | 4/2016 | Kumar ................ H04M 3/5232 |
| 9,535,651 B2 | 1/2017 | Khalatian |
| 2002/0038346 A1 | 3/2002 | Morrison et al. |
| 2002/0101445 A1 | 8/2002 | Berque |
| 2002/0191028 A1 | 12/2002 | Senechalle et al. |
| 2003/0085923 A1 | 5/2003 | Chen et al. |
| 2003/0088623 A1 | 5/2003 | Kusuda |
| 2003/0093464 A1 | 5/2003 | Clough et al. |
| 2004/0075619 A1 | 4/2004 | Hansen |
| 2004/0078441 A1 | 4/2004 | Malik et al. |
| 2004/0080504 A1 | 4/2004 | Salesky et al. |
| 2004/0210658 A1 * | 10/2004 | Guillermo ............ G06F 3/0481 709/227 |
| 2004/0252185 A1 | 12/2004 | Vernon et al. |
| 2004/0253991 A1 | 12/2004 | Azuma |
| 2004/0268263 A1 | 12/2004 | Van Dok et al. |
| 2005/0129275 A1 | 6/2005 | Porter et al. |
| 2005/0129277 A1 | 6/2005 | Porter et al. |
| 2005/0141694 A1 * | 6/2005 | Wengrovitz ........ H04M 3/5191 379/265.09 |
| 2005/0223343 A1 | 10/2005 | Travis et al. |
| 2005/0235014 A1 | 10/2005 | Schauser et al. |
| 2005/0246634 A1 | 11/2005 | Ortwein et al. |
| 2005/0268237 A1 | 12/2005 | Crane et al. |
| 2006/0031779 A1 | 2/2006 | Theurer et al. |
| 2006/0130109 A1 | 6/2006 | Zenith |
| 2007/0038956 A1 | 2/2007 | Morris |
| 2007/0245249 A1 | 10/2007 | Weisberg |
| 2008/0016155 A1 | 1/2008 | Khalatian |
| 2008/0052377 A1 | 2/2008 | Light |
| 2008/0167124 A1 | 7/2008 | Korchemniy et al. |
| 2008/0209387 A1 | 8/2008 | Biehl et al. |
| 2008/0276183 A1 | 11/2008 | Siegrist et al. |
| 2008/0276184 A1 | 11/2008 | Buffet et al. |
| 2009/0024952 A1 | 1/2009 | Brush et al. |
| 2009/0055500 A1 | 2/2009 | Haynes et al. |
| 2009/0100328 A1 | 4/2009 | Asakawa et al. |
| 2009/0158163 A1 | 6/2009 | Stephens et al. |
| 2009/0164581 A1 | 6/2009 | Bove et al. |
| 2009/0219379 A1 | 9/2009 | Rossato et al. |
| 2009/0247136 A1 * | 10/2009 | Srinivasan ............ H04M 3/51 455/414.2 |
| 2009/0254840 A1 | 10/2009 | Churchill et al. |
| 2009/0271713 A1 | 10/2009 | Stull et al. |
| 2009/0327441 A1 * | 12/2009 | Lee ..................... H04L 12/5815 709/206 |
| 2010/0017412 A1 | 1/2010 | Horowitz et al. |
| 2010/0036670 A1 * | 2/2010 | Hill ....................... G06Q 30/016 705/304 |
| 2010/0037153 A1 | 2/2010 | Rogers |
| 2010/0111406 A1 | 5/2010 | Hertzfeld et al. |
| 2010/0115042 A1 | 5/2010 | Turner |
| 2010/0131868 A1 | 5/2010 | Chawla et al. |
| 2010/0199187 A1 | 8/2010 | Lin et al. |
| 2010/0257457 A1 | 10/2010 | De Goes |
| 2010/0296646 A1 * | 11/2010 | Hemm .................. G06Q 10/107 379/265.02 |
| 2010/0306642 A1 | 12/2010 | Lowet et al. |
| 2011/0087984 A1 | 4/2011 | Jitkoff et al. |
| 2011/0154219 A1 | 6/2011 | Khalatian |
| 2011/0173256 A1 | 7/2011 | Khalatian |
| 2011/0276900 A1 | 11/2011 | Khan et al. |
| 2011/0307402 A1 * | 12/2011 | Krishnakumar ..... G06Q 10/105 705/321 |
| 2012/0030616 A1 | 2/2012 | Howes et al. |
| 2012/0069045 A1 | 3/2012 | Hashimoto et al. |
| 2012/0185784 A1 | 7/2012 | Katz |
| 2012/0189272 A1 | 7/2012 | Kunigita et al. |
| 2012/0254770 A1 | 10/2012 | Ophir |
| 2013/0055113 A1 | 2/2013 | Chazin et al. |
| 2013/0080928 A1 | 3/2013 | Zhuang et al. |
| 2013/0212466 A1 | 8/2013 | Khalatian |
| 2014/0119531 A1 * | 5/2014 | Tuchman ............ H04M 3/5166 379/265.09 |
| 2014/0161241 A1 * | 6/2014 | Baranovsky ............ H04M 3/51 379/142.05 |
| 2014/0164934 A1 | 6/2014 | Yang |
| 2014/0173078 A1 * | 6/2014 | McCord .................. H04L 45/44 709/223 |
| 2014/0258501 A1 * | 9/2014 | D'Arcy ................ H04M 3/5233 709/224 |
| 2014/0278534 A1 * | 9/2014 | Romeo .................. G06F 19/322 705/3 |
| 2015/0052067 A1 * | 2/2015 | Thiyagarajan ....... G06Q 30/016 705/304 |
| 2015/0149916 A1 | 5/2015 | Mendez et al. |
| 2015/0244814 A1 | 8/2015 | Khalatian et al. |
| 2015/0310446 A1 * | 10/2015 | Tuchman .................. G06Q 30/016 705/304 |
| 2015/0324772 A1 * | 11/2015 | Sarris ..................... G06Q 20/108 705/42 |
| 2017/0090853 A1 | 3/2017 | Khalatian et al. |

OTHER PUBLICATIONS

U.S. Appl. No. 12/970,501, Notice of Allowance dated Sep. 1, 2016, 7 pages.
U.S. Appl. No. 12/970,501, Non-Final Office Action dated Apr. 26, 2016, 14 pages.
U.S. Appl. No. 13/762,725, Non-Final Office Action dated May 5, 2016, 17 pages.
U.S. Appl. No. 14/628,640, Non-Final Office Action dated Feb. 24, 2017, 13 pages.

(56) References Cited

OTHER PUBLICATIONS

U.S. Appl. No. 14/628,640, Final Office Action dated Jun. 22, 2017, 17 pages.
U.S. Appl. No. 13/762,725, Notice of Allowance dated Oct. 3, 2017, 13 pages.
U.S. Appl. No. 14/628,640, Advisory Action dated Sep. 15, 2017, 3 pages.
U.S. Appl. No. 11/456,613, filed Jul. 11, 2006 now U.S. Pat. No. 7,933,955 dated Apr. 26, 2011.
U.S. Appl. No. 13/071,607, filed Mar. 25, 2011, now abandoned.
U.S. Appl. No. 14/628,640, filed Dec. 16, 2010.
U.S. Appl. No. 14/970,501, filed Dec. 16, 2010.
U.S. Appl. No. 14/865,711, filed Sep. 25, 2015.
U.S. Appl. No. 13/762,725, filed Feb. 8, 2013.
U.S. Appl. No. 11/456,613, dated Aug. 8, 2008, Non-Final Office Action.
U.S. Appl. No. 11/456,613, dated Jul. 13, 2009, Final Office Action.
U.S. Appl. No. 11/456,613, dated May 6, 2010, Non-Final Office Action.
U.S. Appl. No. 11/456,613, dated Jan. 12, 2011, Notice of Allowance.
U.S. Appl. No. 13/071,607, dated Aug. 5, 2011, Non-Final Office Action.
U.S. Appl. No. 14/628,640.
U.S. Appl. No. 14/970,501, dated Feb. 5, 2013, Non-Final Office Action.
U.S. Appl. No. 14/970,501, dated May 15, 2013, Final Office Action.
U.S. Appl. No. 14/970,501, dated Jul. 22, 2013, Advisory Action.
U.S. Appl. No. 14/970,501, dated Feb. 12, 2015, Non-Final Office Action.
U.S. Appl. No. 14/970,501, dated Jul. 31, 2015, Final Office Action.
U.S. Appl. No. 14/970,501, dated Oct. 15, 2015, Advisory Action.
U.S. Appl. No. 14/865,711.
U.S. Appl. No. 13/762,725, dated Apr. 9, 2015, Non-Final Office Action.
U.S. Appl. No. 13/762,725, dated Nov. 12, 2015, Final Office Action.
Brandon De Hoyos, How to Use Facebook Chat Options, about.com, pp. 1-6, http://im.about.com/od/facebookcha1/ss/facebookchatoptions.htm, (Facebook Chat Options for FacebookChat.pdf).
Dictionary.com, Jul. 27, 2011, https://web.archive.org/web/20110727234611/http://dictionary.reference.com/browse/Expand, (Expand.pdf), pp. 1-2.
Advisory Action for U.S. Appl. No. 13/762,725, dated Feb. 3, 2016, all pages.

* cited by examiner

Shipping Address

Shipping Address

Doe

Company Name (optional)

111  111-1111

111 Main Street

Apt, Suite, Bldg. (optional)

Homeville  AL  11111

United States  ☐ This is a business address ⓘ

Apple Shipping Policy | Learn more
- Signature may be required for delivery
- We do not ship to P.O. boxes
- Delivery estimates below include item preparation and shipping time
- We do not ship directly to APO/FPO addresses.

Shipping Notifications ⓘ

Shipment notification emails are sent to the Billing Contact. Another recipient email address may be added below.

johndoe@gmail.com

For shipment updates via text messages, enter a mobile number below.

Area Code  Mobile Phone (optional)

Continue

Chat Now

③ Payment

④ Account

☐ Yes, I'd like Apple to recycle my old computer for free.
Terms & Condiitons

Cart subtotal  $399.00
Free Shipping  $0.00
Order Total  $399.00

Enter Promo Code

505

515  Live Expert https://secure1.store.apple.com/us/checkout#shipping-box nc.[US]

Shipping Address

Shipping Address

Doe

Company Name (optional)

111 | 111-1111

111 Main Street

Apt, Suite, Bldg. (optional)

Homeville | AL | 11111

United States ☐ This is a business address ⓘ

Apple Shipping Policy | Learn more
- Signature may be required for delivery
- We do not ship to P.O. boxes
- Delivery estimates below include item preparation and shipping time
- We do not ship directly to APO/FPO addresses.

Shipping Notifications ⓘ

Shipment notification emails are sent to the Billing Contact. Another recipient email address may be added below.

johndoe@gmail.com

For shipment updates via text messages, enter a mobile number below.

Area Code | Mobile Phone (optional)

[Continue]

Chat Now

③ Payment

④ Account

☐ Yes, I'd like Apple to recycle my old computer for free.
Terms & Condiitons

Enter Promo Code

Cart subtotal $399.00
Free Shipping $0.00

Order Total $399.00 https://secure1.store.apple.com/us/checkout#shipping-box nc:[US]

505

530

Live Expert

Expert Name
info

Expert Name:
Hello, how may I help you?

12:56

Disconnect

Hi, I'm looking for |

CO-BROWSING PREVIEW OF QUEUED CUSTOMER CONTACTS

CROSS-REFERENCE

The present application claims benefit under 35 USC 119(e) of U.S. Provisional Application No. 62/094,276, filed on Dec. 19, 2014 by Khalatian and entitled "Co-Browsing Preview of Queued Customer Contacts," of which the entire disclosure is incorporated herein by reference for all purposes.

BACKGROUND OF THE INVENTION

Embodiments of the present invention relate generally to methods and systems for customer contact assignment in a task routing system such as a Customer Relationship Management (CRM) system, Automatic Call Distribution (ACD) system, or other similar system and more particularly to providing a co-browsing preview of a queued contact before and during handling of the contact.

Customer Relationship Management (CRM) systems provide support for customers of a product or service by allowing those users to make requests for service that can include a question posed by the user related to the product or service. For example, a user may log onto or access a CRM system provided by a manufacturer of cellphones and request information related to use of that device and that may include a question such as "How do I adjust the brightness of the display?" Generally speaking, these systems receive requests for service, e.g., in the form of a phone call, web page form, instant message, email, etc., and route the requests to a human agent for addressing the request and providing an answer to the question. In ideal cases, the agent is selected based on the topic of the question or request and a predefined profile of that agent that includes indications of the agent's skills and/or expertise. This skills-based route can be done by an Automated Call Distribution (ACD) system that is either part of or separate from the CRM system.

Once an agent is selected, the routing can be accomplished by placing the customer contact into a queue for the selected agent. Typically, the agent is provided a graphical and/or textual representation of this queue. Thus, the agent can see the number of contacts waiting to be handled and may even be able to see some identifying information about the contact such as a name, phone number, customer ID number, ticket number, etc. However, little other information about the customer or the reason for the contact is available to the agent while the contact is in the agent's queue. Rather, the agent typically needs to initiate a session, e.g., a chat session, voice call, Instant Messaging (IM) session, with the customer to collect more information about the reason for the contact. Then, if the agent finds that the contact was not optimally routed for some reason, the agent may need to transfer the customer to another channel, e.g., from a chat session to a voice call, or even to another agent. In such cases, customer experience or satisfaction may suffer. Hence, there is a need for improved methods and systems for customer contact assignment in a task routing system.

BRIEF SUMMARY OF THE INVENTION

Embodiments of the invention provide systems and methods for providing a co-browsing preview of a queued contact. According to one embodiment, providing a co-browsing preview of a queued contact can comprise receiving a contact from a customer, selecting an agent from a plurality of agents based at least in part on the contact and a defined set of skills for each of the agents, and assigning the contact to the selected agent. Assigning the contact to the selected agent can comprise placing the contact into a queue for the selected agent. A live, real-time co-browsing preview of a current user interface of the customer can be provided to the selected agent while the contact is assigned to the selected agent's queue and before the customer is connected to the selected agent. A selection of the contact from the queue for the selected agent can be received. In response to the selection and before initiating an interaction between the customer and the selected agent, a set of options for handling the contact based on the live, real-time co-browsing preview can be provided to the agent. The contact can then be handled based on one or more of the set of options.

According to one embodiment, the options can include a chat option. In such cases, handling the contact can further comprise receiving a selection of the chat option. In response to receiving the selection of the chat option, a chat session can be initiated and conducted between the customer and the selected agent while maintaining the co-browsing preview.

Additionally or alternatively, the options can include a transfer option. In such cases, handling the contact can further comprise receiving a selection of the transfer option. In response to receiving the selection of the transfer option, a selection of an agent of the plurality of agents other than the selected agent can be received. The contact can then be assigned to the agent of the plurality of agents other than the selected agent.

Additionally or alternatively, the options can include a Voice over Internet Protocol (VoIP) call option. In such cases, handling the contact can further comprise receiving a selection of the VoIP call option. In response to receiving the selection of the VoIP call option, a determination can be made as to whether VoIP calling is available to the customer. In response to determining VoIP calling is available to the customer, a waiting state can be indicated to the agent, the customer can be invited to participate in a VoIP call, and in response to the invitation being accepted, the VoIP call can be initiated and conducted between the customer and the agent while maintaining the co-browsing preview.

Additionally or alternatively, the options can include a video call option. In such cases, handling the contact can further comprise receiving a selection of the video call option. In response to receiving the selection of the video call option, a determination can be made as to whether video calling is available to the customer. In response to determining video calling is available to the customer, a waiting state can be indicated to the agent, the customer can be invited to participate in a video call, and in response to the invitation being accepted, the video call can be initiated and conducted between the customer and the agent while maintaining the co-browsing preview.

In some implementations, in response to determining VoIP calling or video calling is not available to the customer, a waiting state can be indicated to the agent and the customer can be invited to participate in a Public Switched Telephone Network (PSTN) call. In response to the invitation being accepted, a contact telephone number for the customer can be received and the PSTN call can be initiated and conducted between the customer and the agent while maintaining the co-browsing preview.

BRIEF DESCRIPTION OF THE DRAWINGS

FIGS. 5A-5G are a series of screenshots illustrating exemplary user interfaces for providing co-browsing previews of queued customer contacts in a chat scenario according to one embodiment of the present invention.

FIGS. 7A-7C are a series of screenshots illustrating exemplary user interfaces for providing co-browsing previews of queued customer contacts in a contact transfer scenario according to another embodiment of the present invention.

FIGS. 9A-9D are a series of screenshots illustrating exemplary user interfaces for providing co-browsing previews of queued customer contacts in a Voice over IP (VoIP) call scenario according to one embodiment of the present invention.

DETAILED DESCRIPTION OF THE INVENTION

Figure 1:
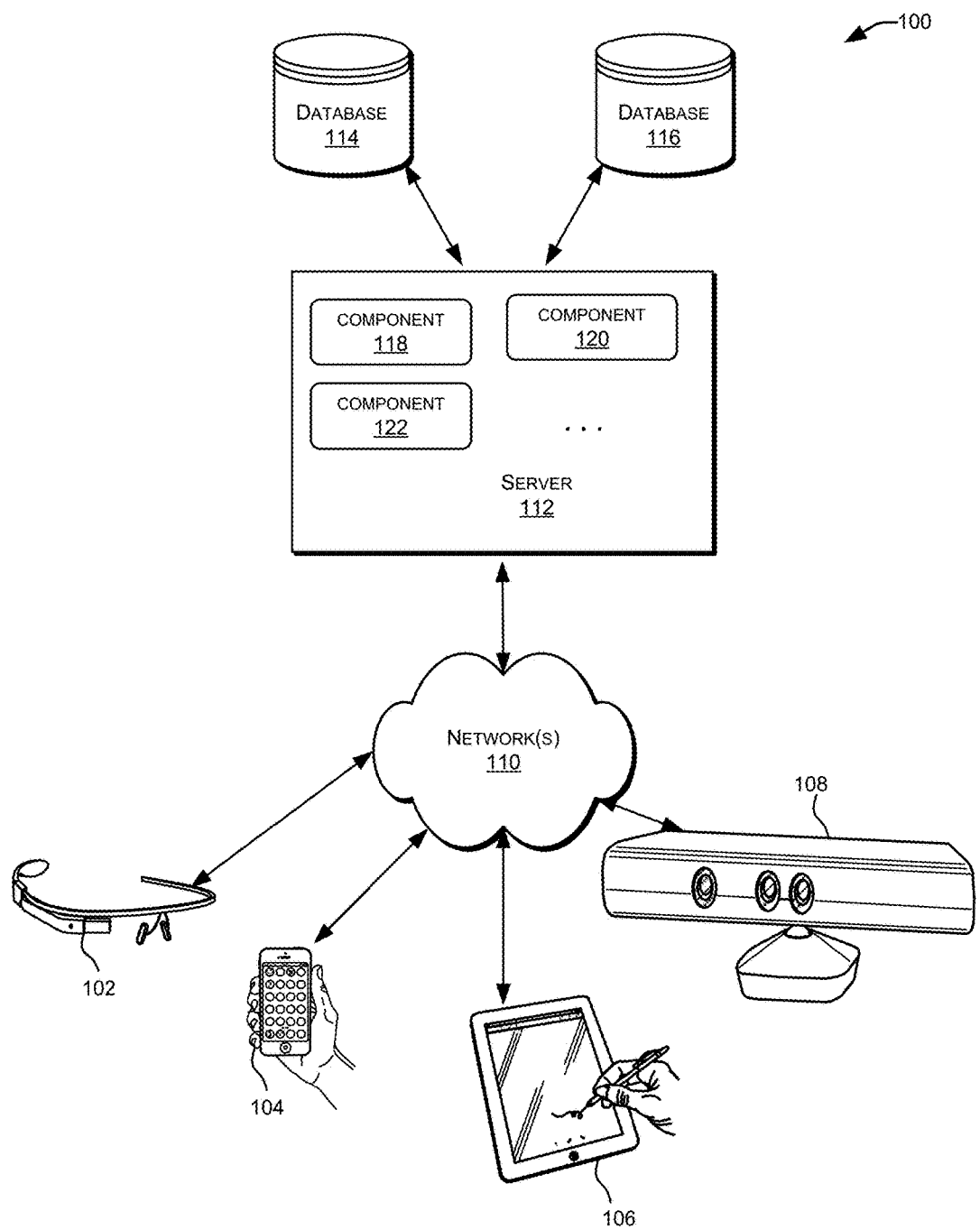
FIG. 1 is a block diagram illustrating components of an exemplary distributed system in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

FIG. 1 is a block diagram illustrating components of an exemplary distributed system in which various embodiments of the present invention may be implemented. In the illustrated embodiment, distributed system 100 includes one or more client computing devices 102, 104, 106, and 108, which are configured to execute and operate a client application such as a web browser, proprietary client (e.g., Oracle Forms), or the like over one or more network(s) 110. Server 112 may be communicatively coupled with remote client computing devices 102, 104, 106, and 108 via network 110.

In various embodiments, server 112 may be adapted to run one or more services or software applications provided by one or more of the components of the system. In some embodiments, these services may be offered as web-based or cloud services or under a Software as a Service (SaaS) model to the users of client computing devices 102, 104, 106, and/or 108. Users operating client computing devices 102, 104, 106, and/or 108 may in turn utilize one or more client applications to interact with server 112 to utilize the services provided by these components.

In the configuration depicted in the figure, the software components 118, 120 and 122 of system 100 are shown as being implemented on server 112. In other embodiments, one or more of the components of system 100 and/or the services provided by these components may also be implemented by one or more of the client computing devices 102, 104, 106, and/or 108. Users operating the client computing devices may then utilize one or more client applications to use the services provided by these components. These components may be implemented in hardware, firmware, software, or combinations thereof. It should be appreciated that various different system configurations are possible, which may be different from distributed system 100. The embodiment shown in the figure is thus one example of a distributed system for implementing an embodiment system and is not intended to be limiting.

Client computing devices 102, 104, 106, and/or 108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 102, 104, 106, and 108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 110.

Although exemplary distributed system 100 is shown with four client computing devices, any number of client computing devices may be supported. Other devices, such as devices with sensors, etc., may interact with server 112.

Network(s) 110 in distributed system 100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), such as one based on Ethernet, Token-Ring and/or the like. Network(s) 110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 112 may be adapted to run one or more services or software applications described in the foregoing disclosure. For example, server 112 may correspond to a server for performing processing described above according to an embodiment of the present disclosure.

Server 112 may run an operating system including any of those discussed above, as well as any commercially available server operating system. Server 112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 112 may include one or more applications to analyze and consolidate data feeds and/or event updates received from users of client computing devices 102, 104, 106, and 108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 112 may also include one or more applications to display the data feeds and/or real-time events via one or more display devices of client computing devices 102, 104, 106, and 108.

Distributed system 100 may also include one or more databases 114 and 116. Databases 114 and 116 may reside in a variety of locations. By way of example, one or more of databases 114 and 116 may reside on a non-transitory storage medium local to (and/or resident in) server 112. Alternatively, databases 114 and 116 may be remote from server 112 and in communication with server 112 via a network-based or dedicated connection. In one set of embodiments, databases 114 and 116 may reside in a storage-area network (SAN). Similarly, any necessary files for performing the functions attributed to server 112 may be stored locally on server 112 and/or remotely, as appropriate. In one set of embodiments, databases 114 and 116 may include relational databases, such as databases provided by Oracle, that are adapted to store, update, and retrieve data in response to SQL-formatted commands.

Figure 2:
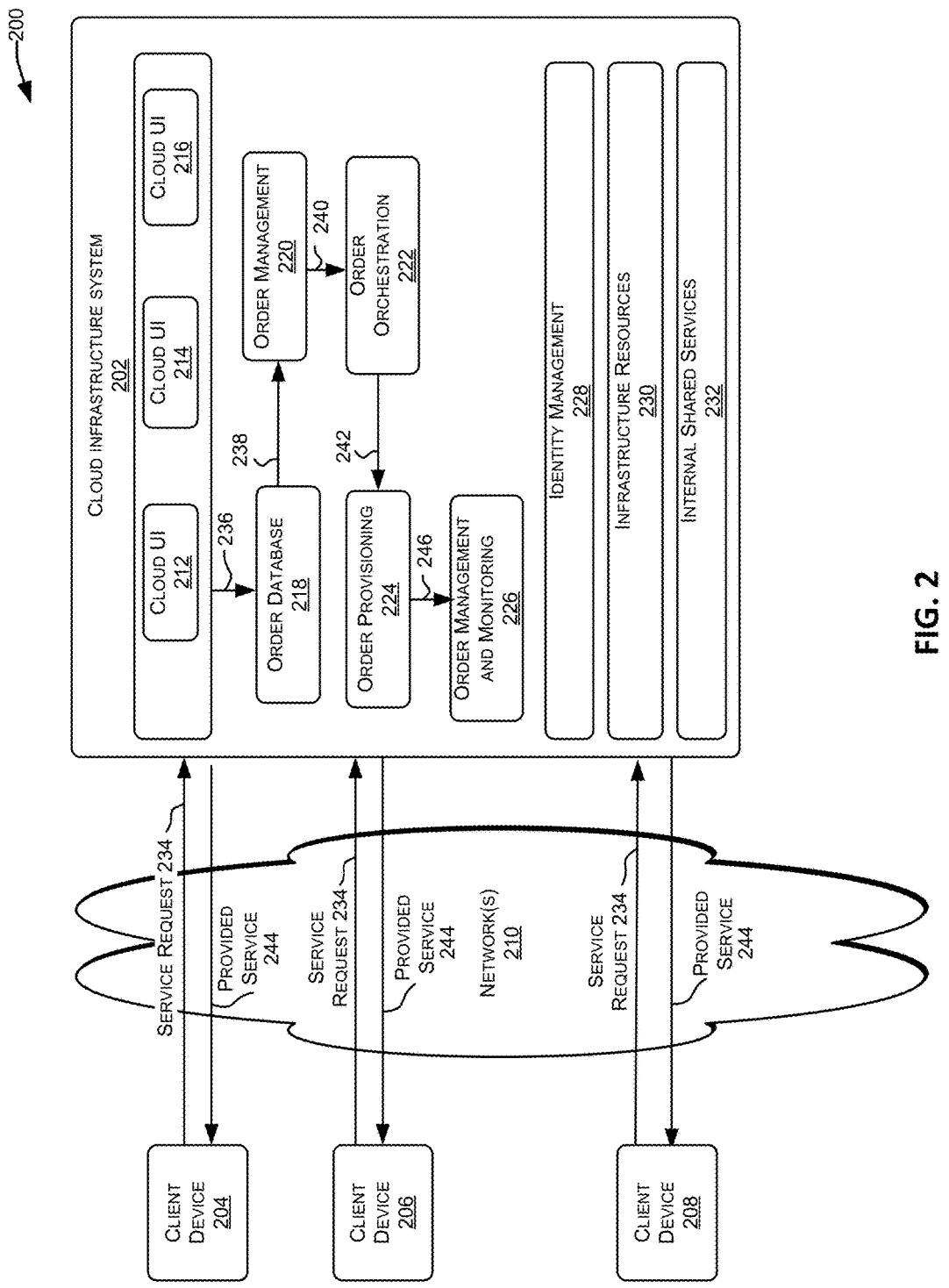
FIG. 2 is a block diagram illustrating components of a system environment by which services provided by embodiments of the present invention may be offered as cloud services.

FIG. 2 is a block diagram illustrating components of a system environment by which services provided by embodiments of the present invention may be offered as cloud services. In the illustrated embodiment, system environment 200 includes one or more client computing devices 204, 206, and 208 that may be used by users to interact with a cloud infrastructure system 202 that provides cloud services. The client computing devices may be configured to operate a client application such as a web browser, a proprietary client application (e.g., Oracle Forms), or some other application, which may be used by a user of the client computing device to interact with cloud infrastructure system 202 to use services provided by cloud infrastructure system 202.

It should be appreciated that cloud infrastructure system 202 depicted in the figure may have other components than those depicted. Further, the embodiment shown in the figure is only one example of a cloud infrastructure system that may incorporate an embodiment of the invention. In some other embodiments, cloud infrastructure system 202 may have more or fewer components than shown in the figure, may combine two or more components, or may have a different configuration or arrangement of components.

Client computing devices 204, 206, and 208 may be devices similar to those described above for 102, 104, 106, and 108.

Although exemplary system environment 200 is shown with three client computing devices, any number of client computing devices may be supported. Other devices such as devices with sensors, etc. may interact with cloud infrastructure system 202.

Network(s) 210 may facilitate communications and exchange of data between clients 204, 206, and 208 and cloud infrastructure system 202. Each network may be any type of network familiar to those skilled in the art that can support data communications using any of a variety of commercially-available protocols, including those described above for network(s) 110.

Cloud infrastructure system 202 may comprise one or more computers and/or servers that may include those described above for server 112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 202 may be adapted to automatically provision, manage and track a customer's subscription to services offered by cloud infrastructure system 202. Cloud infrastructure system 202 may provide the cloud services via different deployment models. For example, services may be provided under a public cloud model in which cloud infrastructure system 202 is owned by an organization selling cloud services (e.g., owned by Oracle) and the services are made available to the general public or different industry enterprises. As another example, services may be provided under a private cloud model in which cloud infrastructure system 202 is operated solely for a single organization and may provide services for one or more entities within the organization. The cloud services may also be provided under a community cloud model in which cloud infrastructure system 202 and the services provided by cloud infrastructure system 202 are shared by several organizations in a related community. The cloud services may also be provided under a hybrid cloud model, which is a combination of two or more different models.

In some embodiments, the services provided by cloud infrastructure system 202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 202. Cloud infrastructure system 202 then performs processing to provide the services in the customer's subscription order.

In some embodiments, the services provided by cloud infrastructure system 202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 202 may also include infrastructure resources 230 for providing the resources used to provide various services to customers of the cloud infrastructure system. In one embodiment, infrastructure resources 230 may include pre-integrated and optimized combinations of hardware, such as servers, storage, and networking resources to execute the services provided by the PaaS platform and the SaaS platform.

In some embodiments, resources in cloud infrastructure system 202 may be shared by multiple users and dynamically re-allocated per demand. Additionally, resources may be allocated to users in different time zones. For example, cloud infrastructure system 230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 232 may be provided that are shared by different components or modules of cloud infrastructure system 202 and by the services provided by cloud infrastructure system 202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 202, and the like.

In one embodiment, as depicted in the figure, cloud management functionality may be provided by one or more modules, such as an order management module 220, an order orchestration module 222, an order provisioning module 224, an order management and monitoring module 226, and an identity management module 228. These modules may include or be provided using one or more computers and/or servers, which may be general purpose computers, specialized server computers, server farms, server clusters, or any other appropriate arrangement and/or combination.

In exemplary operation 234, a customer using a client device, such as client device 204, 206 or 208, may interact with cloud infrastructure system 202 by requesting one or more services provided by cloud infrastructure system 202 and placing an order for a subscription for one or more services offered by cloud infrastructure system 202. In certain embodiments, the customer may access a cloud User Interface (UI), cloud UI 212, cloud UI 214 and/or cloud UI 216 and place a subscription order via these UIs. The order information received by cloud infrastructure system 202 in response to the customer placing an order may include information identifying the customer and one or more services offered by the cloud infrastructure system 202 that the customer intends to subscribe to.

After an order has been placed by the customer, the order information is received via the cloud UIs, 212, 214 and/or 216.

At operation 236, the order is stored in order database 218. Order database 218 can be one of several databases operated by cloud infrastructure system 218 and operated in conjunction with other system elements.

At operation 238, the order information is forwarded to an order management module 220. In some instances, order management module 220 may be configured to perform billing and accounting functions related to the order, such as verifying the order, and upon verification, booking the order.

At operation 240, information regarding the order is communicated to an order orchestration module 222. Order orchestration module 222 may utilize the order information to orchestrate the provisioning of services and resources for the order placed by the customer. In some instances, order orchestration module 222 may orchestrate the provisioning of resources to support the subscribed services using the services of order provisioning module 224.

In certain embodiments, order orchestration module 222 enables the management of business processes associated with each order and applies business logic to determine whether an order should proceed to provisioning. At operation 242, upon receiving an order for a new subscription, order orchestration module 222 sends a request to order provisioning module 224 to allocate resources and configure those resources needed to fulfill the subscription order. Order provisioning module 224 enables the allocation of resources for the services ordered by the customer. Order provisioning module 224 provides a level of abstraction between the cloud services provided by cloud infrastructure system 200 and the physical implementation layer that is used to provision the resources for providing the requested services. Order orchestration module 222 may thus be isolated from implementation details, such as whether or not services and resources are actually provisioned on the fly or pre-provisioned and only allocated/assigned upon request.

At operation 244, once the services and resources are provisioned, a notification of the provided service may be sent to customers on client devices 204, 206 and/or 208 by order provisioning module 224 of cloud infrastructure system 202.

At operation 246, the customer's subscription order may be managed and tracked by an order management and monitoring module 226. In some instances, order management and monitoring module 226 may be configured to collect usage statistics for the services in the subscription order, such as the amount of storage used, the amount data transferred, the number of users, and the amount of system up time and system down time.

In certain embodiments, cloud infrastructure system 200 may include an identity management module 228. Identity management module 228 may be configured to provide identity services, such as access management and authorization services in cloud infrastructure system 200. In some embodiments, identity management module 228 may control information about customers who wish to utilize the services provided by cloud infrastructure system 202. Such information can include information that authenticates the identities of such customers and information that describes which actions those customers are authorized to perform relative to various system resources (e.g., files, directories, applications, communication ports, memory segments, etc.) Identity management module 228 may also include the management of descriptive information about each customer and about how and by whom that descriptive information can be accessed and modified.

Figure 3:
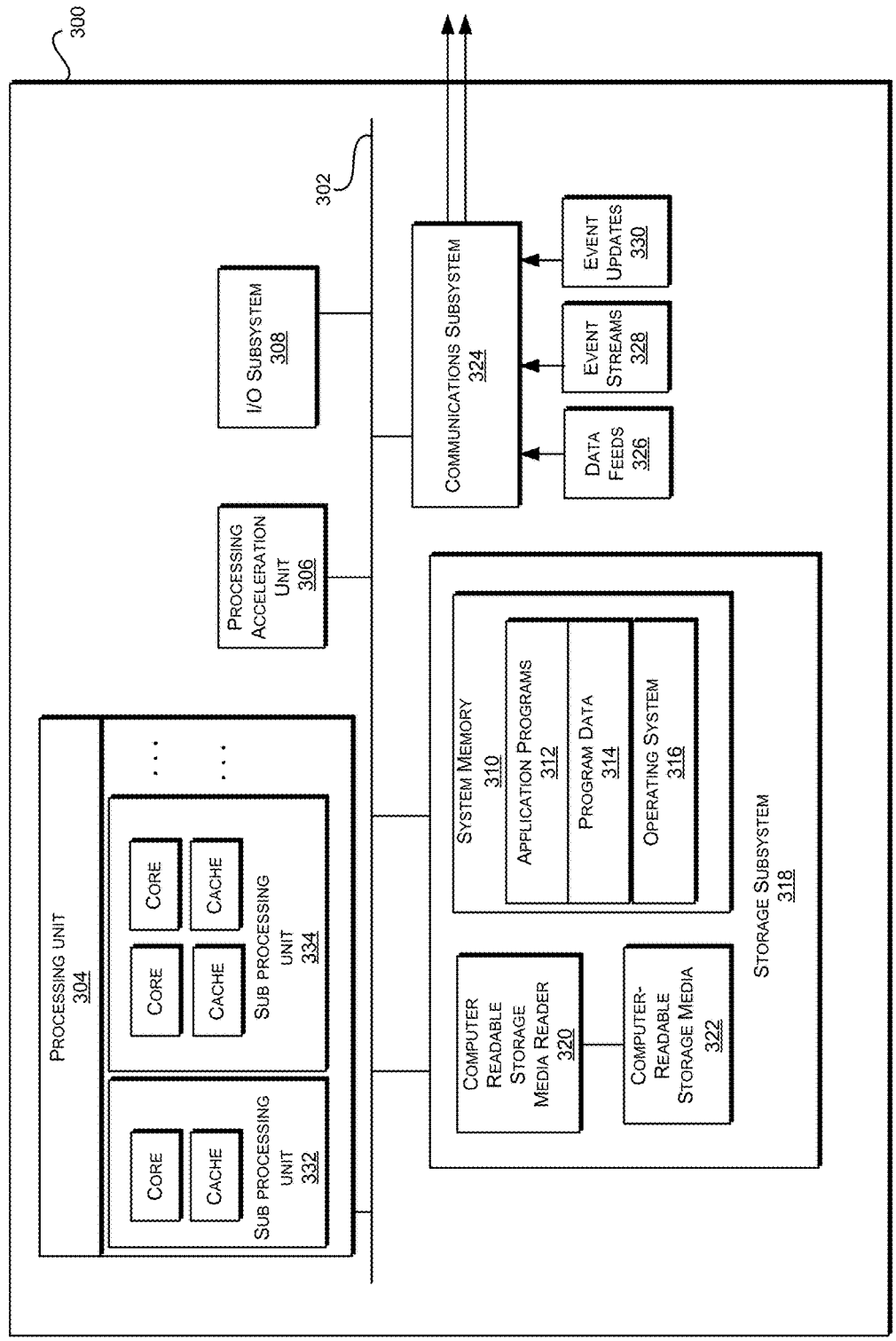
FIG. 3 is a block diagram illustrating an exemplary computer system in which embodiments of the present invention may be implemented.

FIG. 3 is a block diagram illustrating an exemplary computer system in which embodiments of the present invention may be implemented. The system 300 may be used to implement any of the computer systems described above. As shown in the figure, computer system 300 includes a processing unit 304 that communicates with a number of peripheral subsystems via a bus subsystem 302. These peripheral subsystems may include a processing acceleration unit 306, an I/O subsystem 308, a storage subsystem 318 and a communications subsystem 324. Storage subsystem 318 includes tangible computer-readable storage media 322 and a system memory 310.

Bus subsystem 302 provides a mechanism for letting the various components and subsystems of computer system 300 communicate with each other as intended. Although bus subsystem 302 is shown schematically as a single bus, alternative embodiments of the bus subsystem may utilize multiple buses. Bus subsystem 302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 304, which can be implemented as one or more integrated circuits (e.g., a conventional microprocessor or microcontroller), controls the operation of computer system 300. One or more processors may be included in processing unit 304. These processors may include single core or multicore processors. In certain embodiments, processing unit 304 may be implemented as one or more independent processing units 332 and/or 334 with single or multicore processors included in each processing unit. In other embodiments, processing unit 304 may also be implemented as a quad-core processing unit formed by integrating two dual-core processors into a single chip.

In various embodiments, processing unit 304 can execute a variety of programs in response to program code and can maintain multiple concurrently executing programs or processes. At any given time, some or all of the program code to be executed can be resident in processor(s) 304 and/or in storage subsystem 318. Through suitable programming, processor(s) 304 can provide various functionalities described above. Computer system 300 may additionally include a processing acceleration unit 306, which can include a digital signal processor (DSP), a special-purpose processor, and/or the like.

I/O subsystem 308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 300 may comprise a storage subsystem 318 that comprises software elements, shown as being currently located within a system memory 310. System memory 310 may store program instructions that are loadable and executable on processing unit 304, as well as data generated during the execution of these programs.

Depending on the configuration and type of computer system 300, system memory 310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 304. In some implementations, system memory 310 may include multiple different types of memory, such as static random access memory (SRAM) or dynamic random access memory (DRAM). In some implementations, a basic input/output system (BIOS), containing the basic routines that help to transfer information between elements within computer system 300, such as during start-up, may typically be stored in the ROM. By way of example, and not limitation, system memory 310 also illustrates application programs 312, which may include client applications, Web browsers, mid-tier applications, relational database management systems (RDBMS), etc., program data 314, and an operating system 316. By way of example, operating system 316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 318 may also provide a tangible computer-readable storage medium for storing the basic programming and data constructs that provide the functionality of some embodiments. Software (programs, code modules, instructions) that when executed by a processor provide the functionality described above may be stored in storage subsystem 318. These software modules or instructions may be executed by processing unit 304. Storage subsystem 318 may also provide a repository for storing data used in accordance with the present invention.

Storage subsystem 300 may also include a computer-readable storage media reader 320 that can further be connected to computer-readable storage media 322. Together and, optionally, in combination with system memory 310, computer-readable storage media 322 may comprehensively represent remote, local, fixed, and/or removable storage devices plus storage media for temporarily and/or more permanently containing, storing, transmitting, and retrieving computer-readable information.

Computer-readable storage media 322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 300.

By way of example, computer-readable storage media 322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 322 may include, but is not limited to, Zip® drives, flash memory cards, universal serial bus (USB) flash drives, secure digital (SD) cards, DVD disks, digital video tape, and the like. Computer-readable storage media 322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 300.

Communications subsystem 324 provides an interface to other computer systems and networks. Communications subsystem 324 serves as an interface for receiving data from and transmitting data to other systems from computer system 300. For example, communications subsystem 324 may enable computer system 300 to connect to one or more devices via the Internet. In some embodiments communications subsystem 324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 324 can provide wired network connectivity (e.g., Ethernet) in addition to or instead of a wireless interface.

In some embodiments, communications subsystem 324 may also receive input communication in the form of structured and/or unstructured data feeds 326, event streams 328, event updates 330, and the like on behalf of one or more users who may use computer system 300.

By way of example, communications subsystem 324 may be configured to receive data feeds 326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 324 may also be configured to receive data in the form of continuous data streams, which may include event streams 328 of real-time events and/or event updates 330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 324 may also be configured to output the structured and/or unstructured data feeds 326, event streams 328, event updates 330, and the like to one or more databases that may be in communication with one or more streaming data source computers coupled to computer system 300.

Computer system 300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Figure 4:
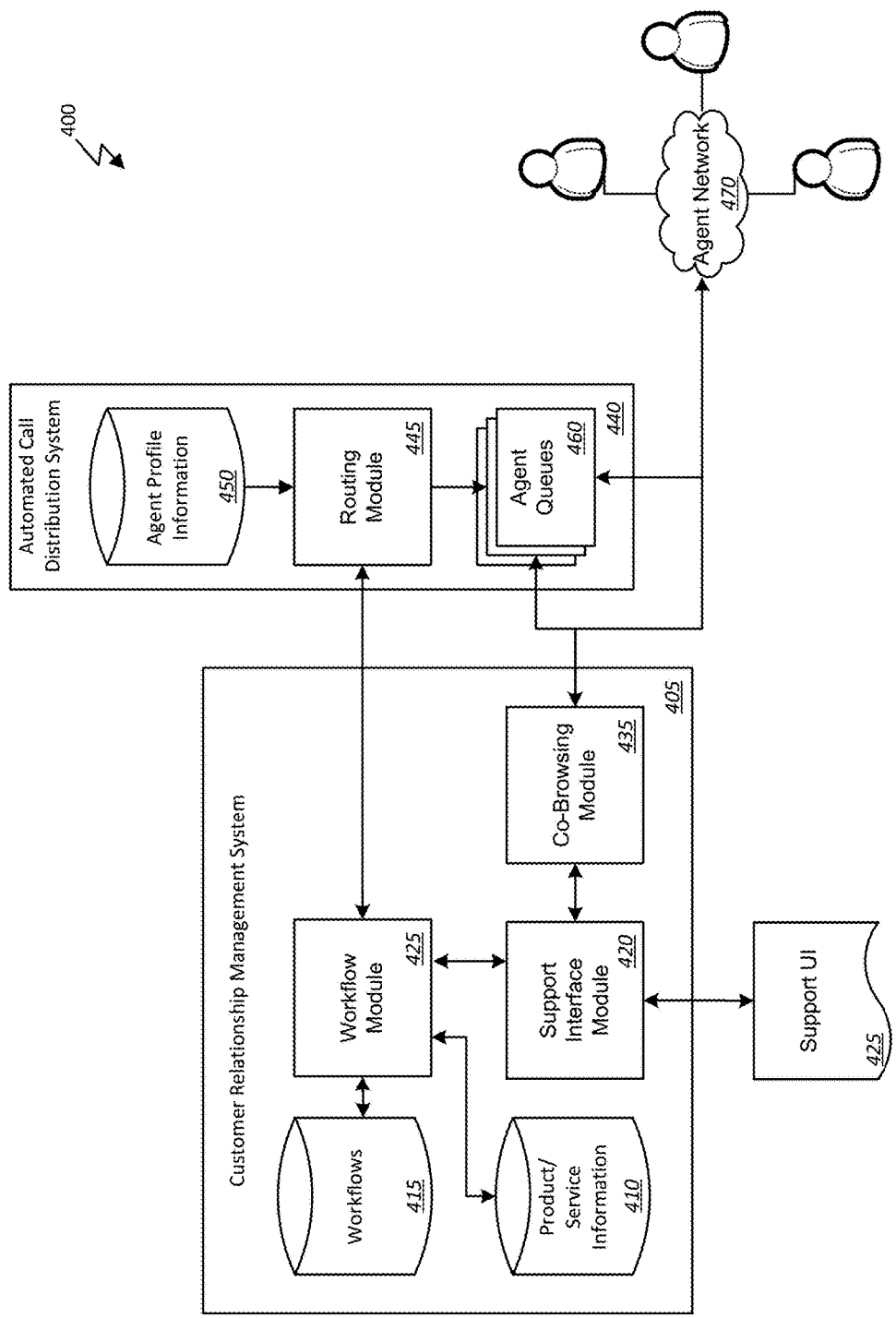
FIG. 4 is a block diagram illustrating, at a high-level, functional components of a system for providing co-browsing previews of queued customer contacts according to one embodiment of the present invention.

FIG. 4 is a block diagram illustrating, at a high-level, functional components of a system for providing co-browsing previews of queued customer contacts according to one embodiment of the present invention. In this example, the system 400 includes a Customer Relationship Management (CRM) system 405 such as may be executed on a server or another computer or computing device as described above. The CRM system 405 can include information 410 for products and/or services supported by the CRM system 405. The CRM system 405 can also include a set of information defining any number of workflows 415. Generally speaking, these workflows 415 can comprise scripts for guiding a customer contact attempting to find information or troubleshoot a problem, selecting and/or guiding a customer service agent through performing troubleshooting, or other actions of the CRM system 405.

The CRM system 405 can support a number of users, such as end users of a product or service, can receive requests for support or service from those users, and process those requests in order to direct the user to appropriate product or service information 410 and/or connect or direct the requesting users to one or more agents 470 for answers to questions posed in the requests. For example, a support interface module 420 of the CRM system 405 can provide one or more interfaces 425 including but not limited to web pages, email addresses, phone lines, chat and/or instant messaging, and/or any of a variety of other communication channels to customer users of the system 400. Through these channels/interfaces 425, the customers can access information and/or make requests for support that may include questions to be answered by the agents 470.

Once received, these requests and/or customer contacts can be evaluated by the workflow module 430 based on the product information 410, for example, to select an agent workflow 415. That is, for a particular product and issue that is the subject of the request or contact, a workflow to be performed, e.g., to troubleshoot a problem, obtain more information, etc., can be selected for performance by a customer service agent. The product information, selected workflow and other information received with the request can be forwarded to a routing module 445 of an Automated Call Distribution (ACD) system 440 which can then direct the request or contact to a selected agent 470 with matching expertise. That is, the routing module 445 can identify an agent with a skillset defined in agent profile information 450 that is appropriate for the nature of the contact and then connect the customer with that agent through email, phone, chat and/or instant messaging, and/or any of a variety of other communication channels. It should be noted that while illustrated here as separate from the CRM system 405, the ACD system 440 and/or routing module 445 and other components thereof may, in other implementations, be part of the CRM system 405 without departing from the scope of the present invention.

According to one embodiment, the CRM system 405 can also include a co-browsing module 435. Generally speaking, the co-browsing module 435 can, once the agent and customer are connected, allow the two to share screen images in near real-time. For example, the agent can view, through his own interface, the current view of the customer's desktop and/or browser window. Such screen sharing through web browsers is referred to herein as co-browsing. Also as used herein, a host is a user or online visitor who is showing his or her computer screen and an agent is a user who is remotely viewing the host's computer screen. An example implementation of web-based co-browsing is described in U.S. application Ser. No. 12/970,501, filed Dec. 16, 2010, titled "Co-browsing Systems and Methods", which is incorporated herein by reference in its entirety.

Once a customer contact has been assigned to an agent but before that customer is actually connected with that agent, i.e., while the customer is waiting or holding for the agent to begin the session, the contact can be assigned to a queue 460. Embodiments of the present invention are directed to providing a co-browsing preview of the customer's browsers while the customer is in the agent's queue. That is, once the agent has been selected, the customer contact has been assigned to that agent, and the contact has been placed into the agent's queue, the agent can be provided with a view of that customer's browser so that the agent can more quickly have a better understanding of the nature of the contact and the customer's current situation. Based on this preview, the agent can make decisions about how best to handle the contact, i.e., whether to handle the contact as a chat, a voice call, to transfer the contact to another agent, etc.

Exemplary user interfaces will now be described to further illustrate embodiments of the present invention and to provide a more complete understanding thereof. However, it should be understood that these examples are provided and described here only for illustrative purposes and are not intended to limit the scope of the present invention. Rather, depending upon the exact implementation, interfaces used with various embodiments can vary significantly in both form and content without departing from the scope of the present invention.

Figure 5B:
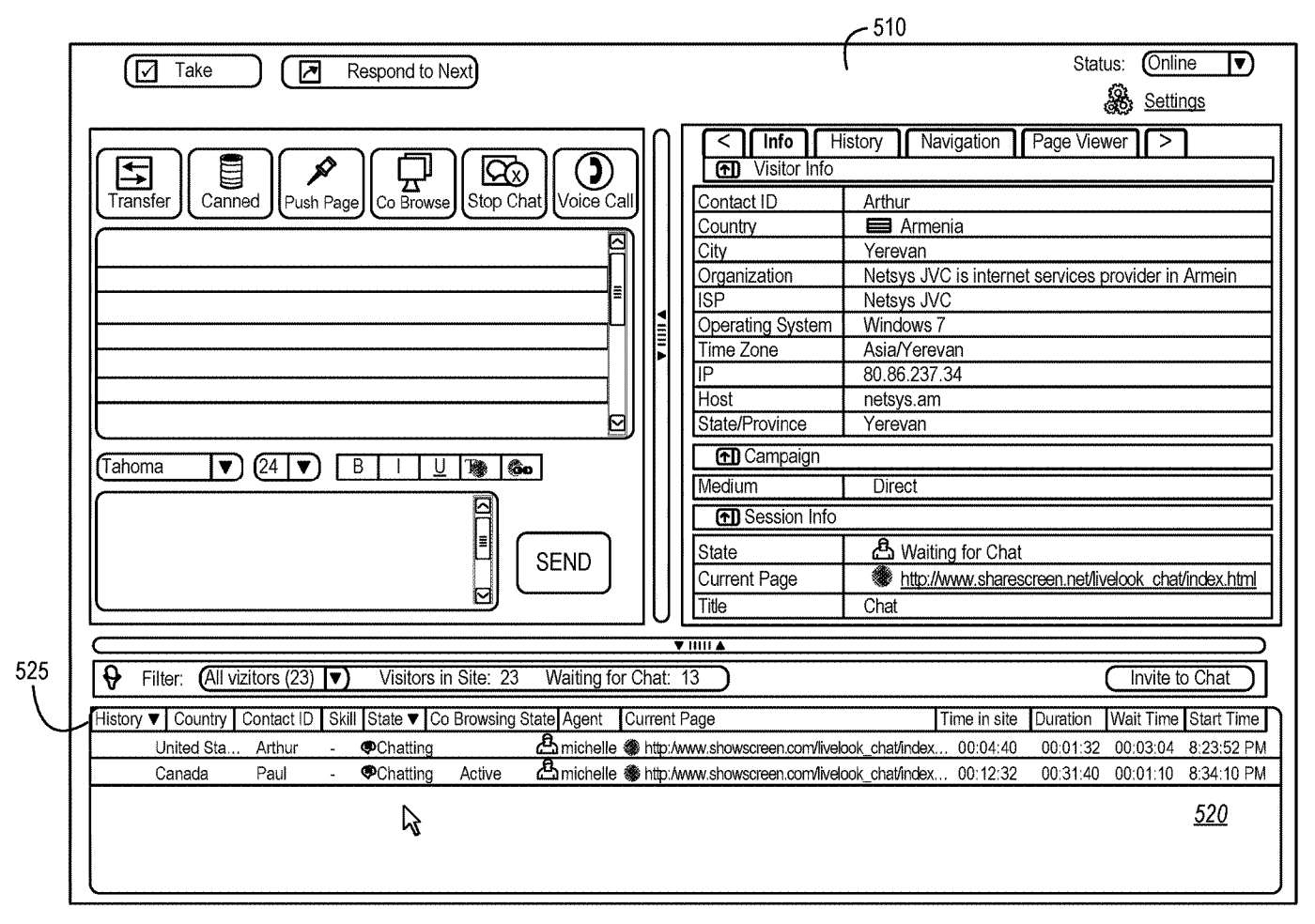
Figure 5C:
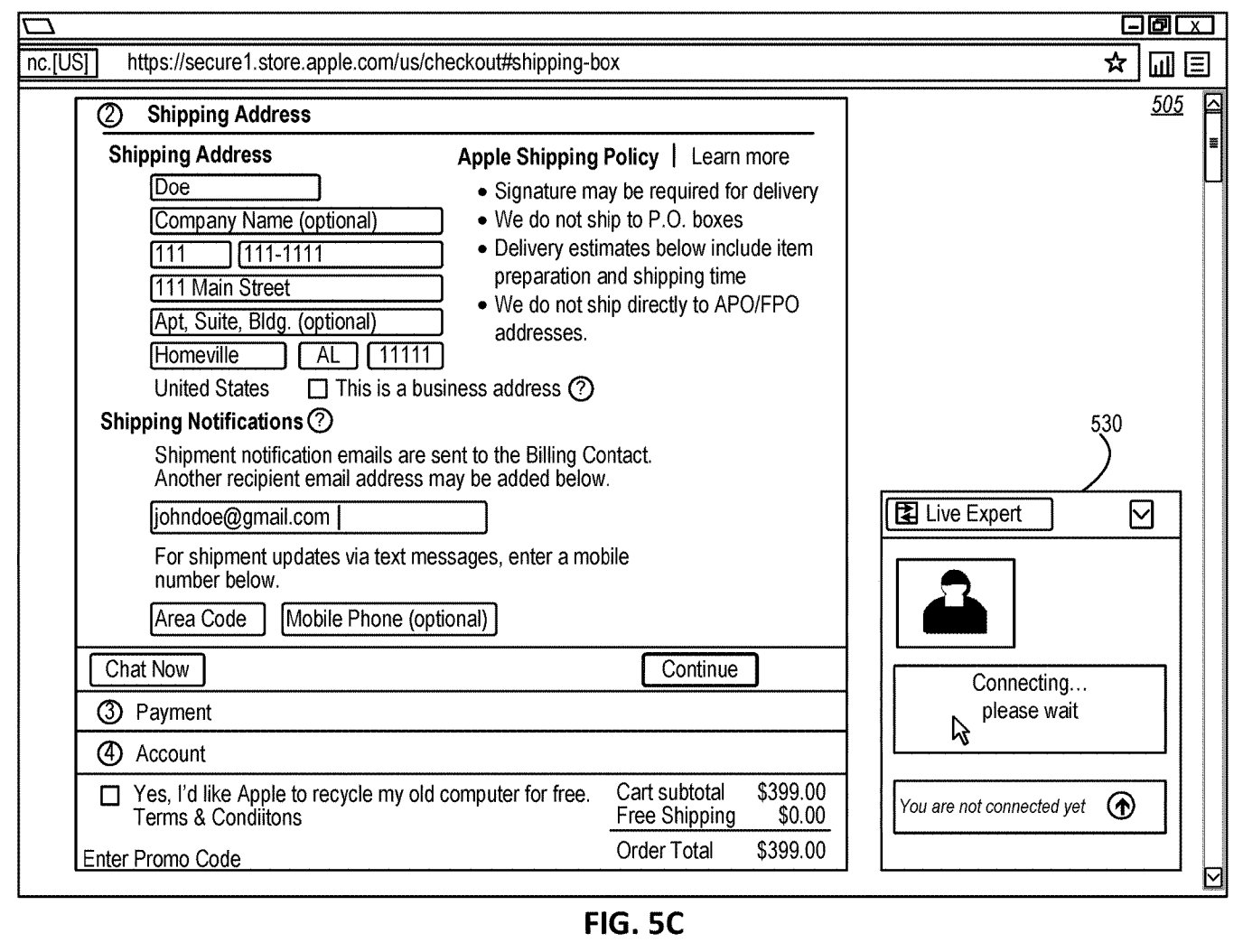
Figure 5D:
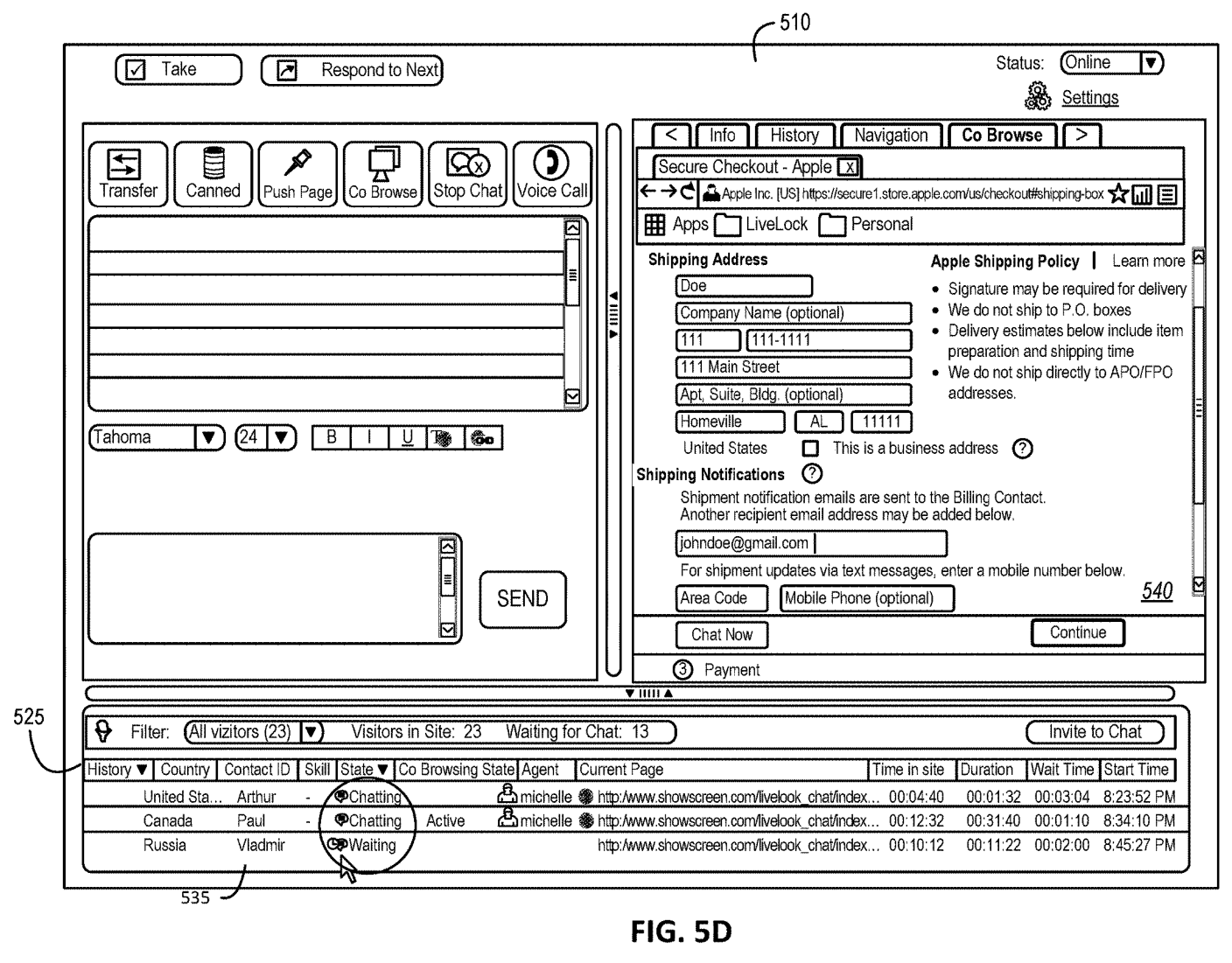
Figure 5E:
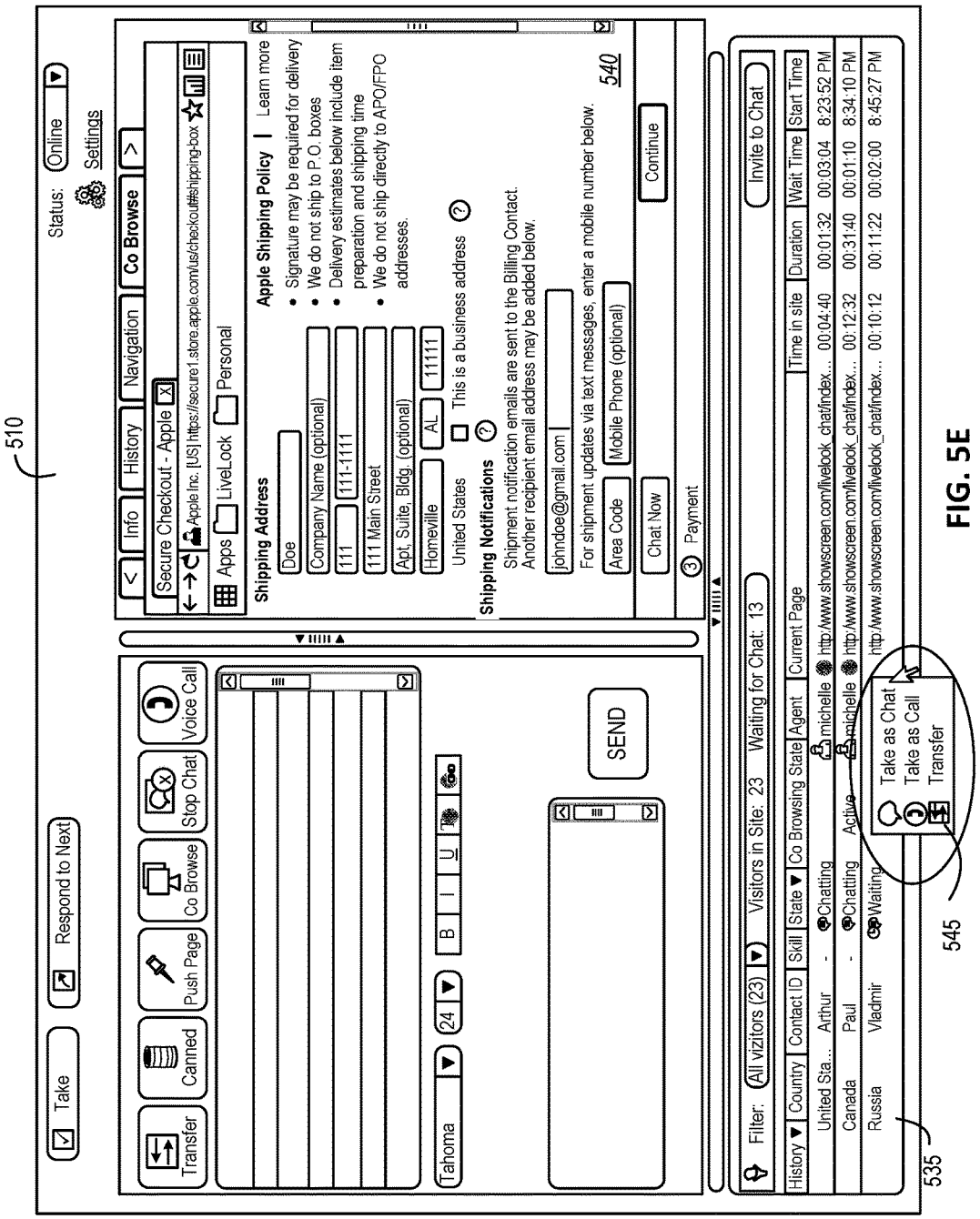

FIGS. 5A-5G are a series of screenshots illustrating exemplary user interfaces for providing co-browsing previews of queued customer contacts in a chat scenario according to one embodiment of the present invention. FIG. 5A illustrates a customer's view 505, i.e., the customer's current browser page, while FIG. 5B illustrates the agent's view 510, i.e., the agent's console interface. In the bottom right corner of the customer's view 505 of FIG. 5A is a button 515 to request an expert. This button 515 can be pressed to initiate a contact with an agent. In the bottom frame 520 or portion of the agent's console 510 illustrated in FIG. 5B is a representation of that agent's queue 525. This representation will list those contacts currently assigned to the agent.

FIG. 5C illustrates the customer's view 505 once the customer has clicked the button 515 to connect to an expert. Here, the customer's view 505 has been updated to include a chat box 530 which indicates that the customer is waiting to be connected to an agent. The agent's view 510 illustrated in FIG. 5D has been updated to show this new, waiting contact 535 in the agent's queue 525 represented at the bottom of the agent's console view 510. If the agent selects this new contact 535 from the queue 525, e.g., by hovering or clicking, the agent's view 510 can be updated to show a co-browsing preview 540 of the customer's current view. In this example, this co-browsing preview 540 is presented in the upper right quadrant of the agent's view 510 and represents a live, real-time or near real-time view of the customer's view 505 as illustrated in FIG. 5C, even before the agent has connected with that customer or began a session with that customer. Based on this preview 540, the agent can then decide to take some action related to this contact.

FIG. 5E shows the agent's console view as illustrated in FIG. 5D but after the agent has made a further selection, e.g., by right clicking, on the customer contact 535. This presents a menu 545 providing a set of options for taking action related to this customer contact. As illustrated in this example, the menu 545 can be presented for selection of options including "Take as Chat" to initiate a chat session with the customer, "Take as Call" to initiate a voice call with the customer, or "Transfer" to transfer the customer to a different agent.

Figure 5G:
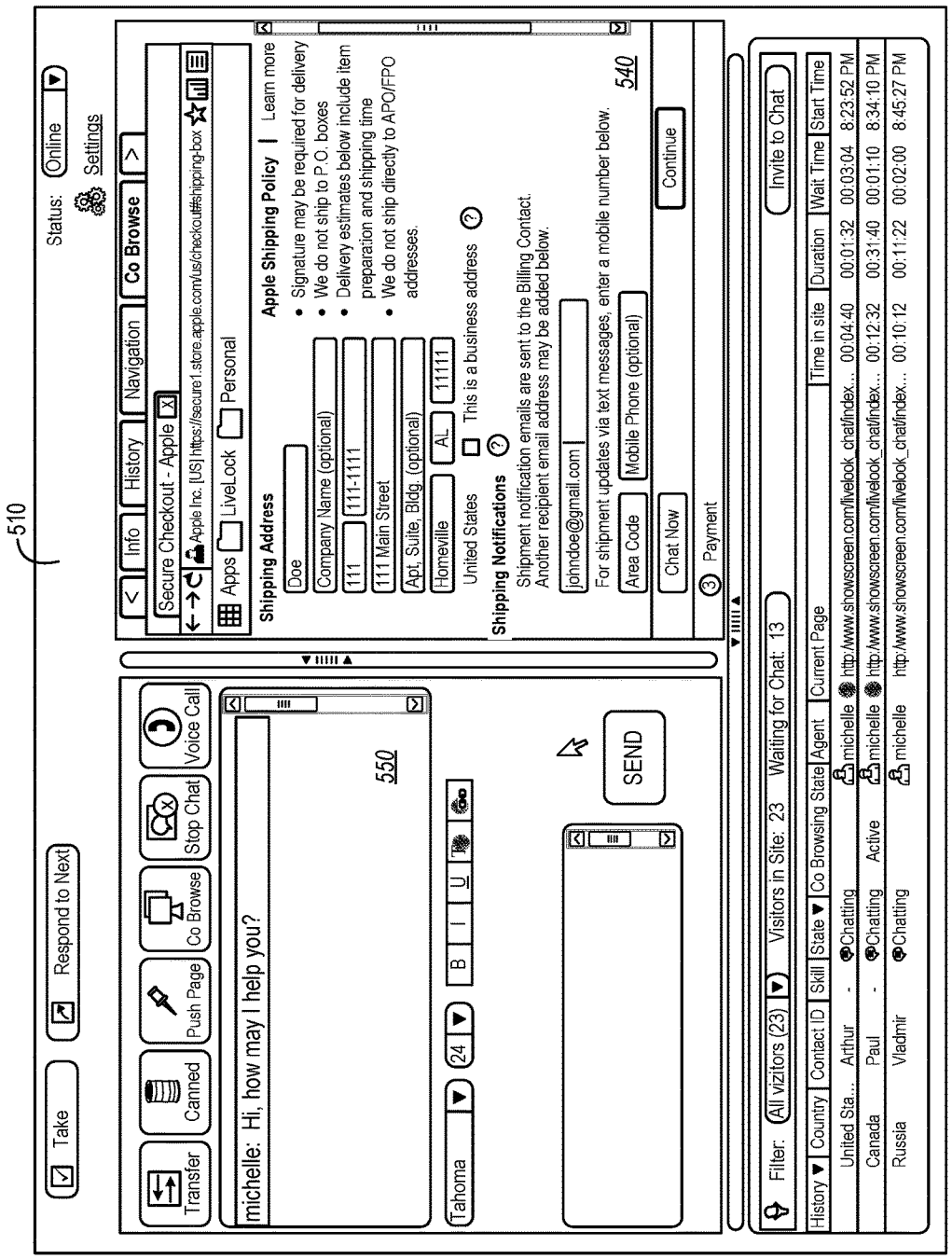

FIG. 5F shows the same customer's view as in FIG. 5C but after the agent has made a selection of the "Take as Chat" action, e.g., by clicking that option on the menu 545 presented in FIG. 5E. Once this selection is made, the customer and agent can be connected in a chat session. Accordingly, the customer's view 505 as illustrated in FIG. 5F is updated to show the live chat in the chat box 530. Also, the agent's console view 510 as illustrated in FIG. 5G is updated to show the live chat in a chat dialog 550 in the upper left quadrant. Additionally, the co-browsing 540 of the customer's view presented in the agent's console view 510 can continue.

Figure 6:
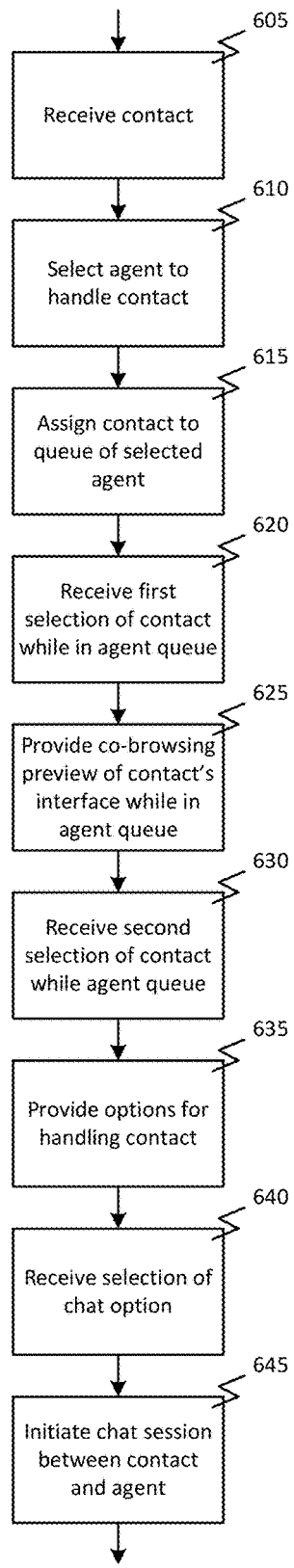
FIG. 6 is a flowchart illustrating a process for providing co-browsing previews of queued customer contacts in a chat scenario according to one embodiment of the present invention.

FIG. 6 is a flowchart illustrating a process for providing co-browsing previews of queued customer contacts in a chat scenario according to one embodiment of the present invention. As illustrated in this example, providing a co-browsing preview of a queued contact can comprise receiving 605 a contact from a customer, selecting 610 an agent from a plurality of agents based at least in part on the contact and a defined set of skills for each of the agents, and assigning 615 the contact to the selected agent. Assigning 615 the contact to the selected agent can comprise placing the contact into a queue for the selected agent. Upon receiving 620 a selection of the contact, e.g., by the agent clicking, hovering, or otherwise manipulating the user interface, a live, real-time co-browsing preview of a current user interface of the customer can be provided 625 to the selected agent while the contact is assigned to the selected agent's queue and before the customer is connected to the selected agent.

After the co-browsing preview has been provided 625, another selection of the contact, e.g., by again clicking, right-clicking, etc., from the queue for the selected agent can be received 630. In response to the selection and before initiating an interaction between the customer and the selected agent a set of options for handling the contact based on the live, real-time co-browsing preview can be provided 635 to the selected agent. The contact can then be handled based on one or more of the set of options. For example, the options can include a chat option. In this case, handling the contact can further comprise receiving 640 a selection of the chat option and in response to receiving 640 the selection of the chat option, initiating 645 and conducting a chat session between the customer and the selected agent while maintaining the co-browsing preview.

Figure 7A:
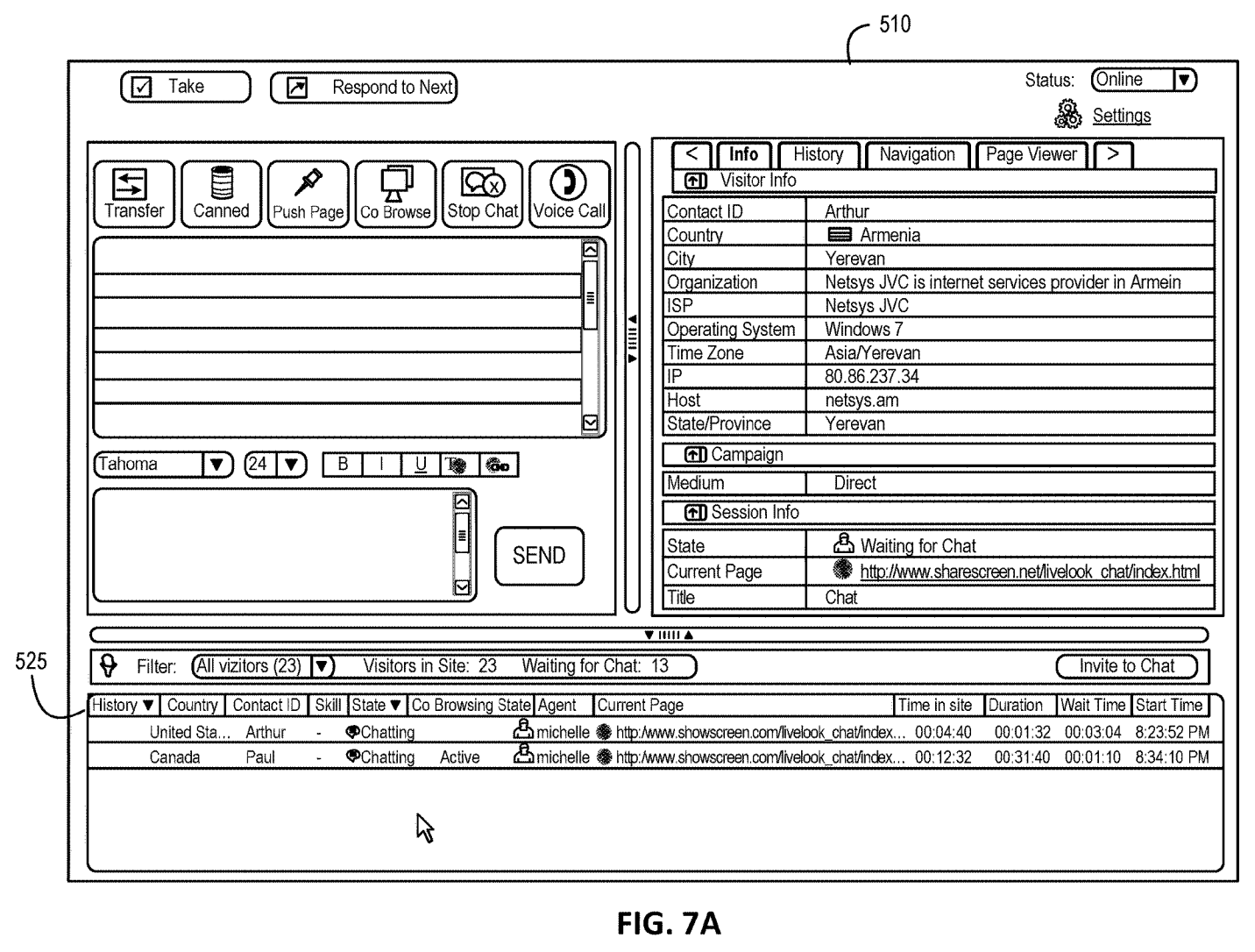
Figure 7B:
Figure 7C:
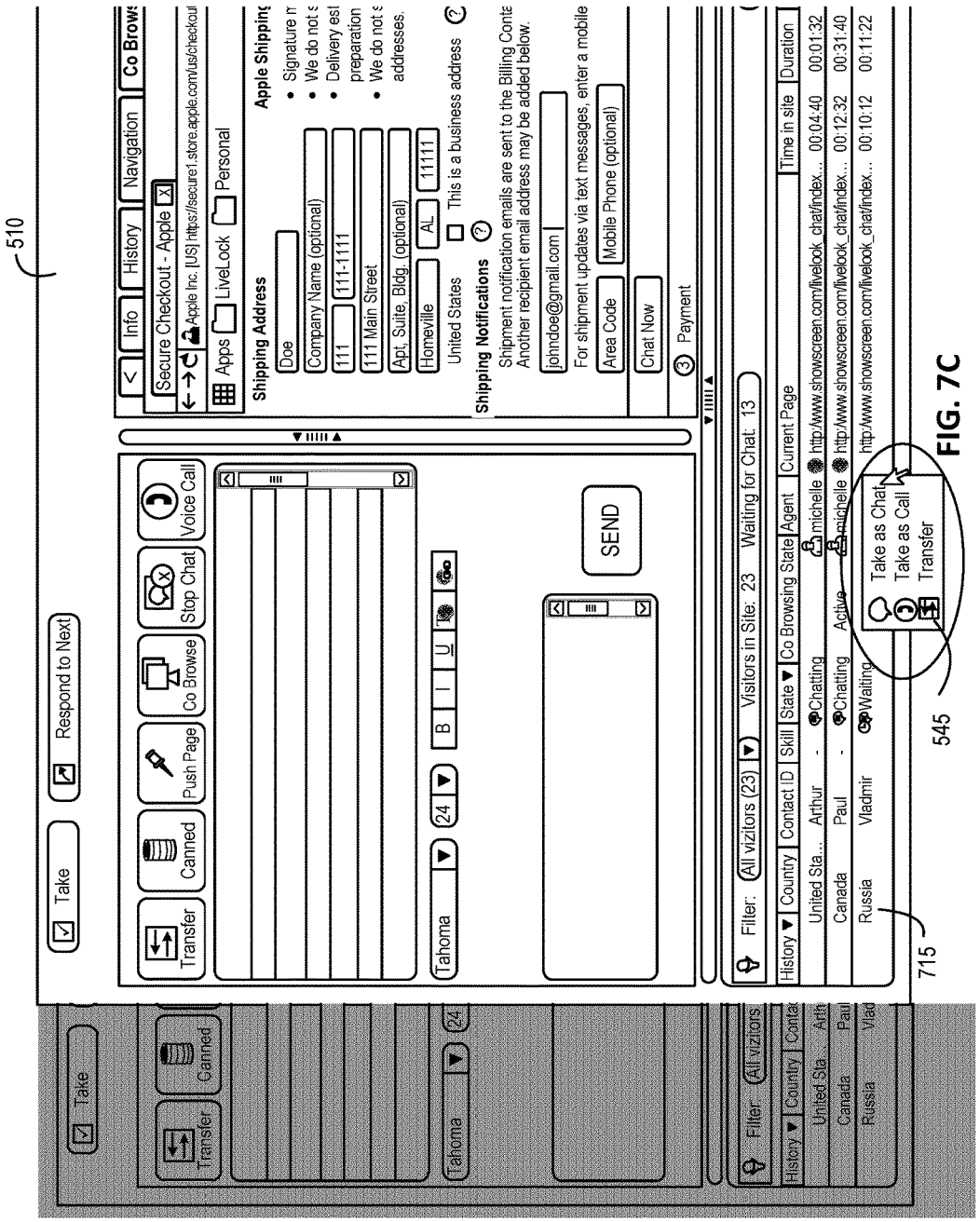

FIGS. 7A-7C are a series of screenshots illustrating exemplary user interfaces for providing co-browsing previews of queued customer contacts in a contact transfer scenario according to another embodiment of the present invention. In this case, the session can begin as described above with reference to FIGS. 5A-5D, i.e., with the customer requesting a chat session and the agent receiving a notification and preview of the customers view. However in this case, when the agent clicks on the new customer contact and is presented with the menu of options as illustrated in FIG. 5E, the agent selects the option to transfer the customer to another agent. As a result and as illustrated in FIG. 7A representing the agent's view 510, the customer is removed from the agent's queue 525 and the customer's view 505 as illustrated in FIG. 7B continues to show in the chat box 530 that the customer is still waiting to connect. FIG. 7C then shows the agent console 705 of another agent, i.e., the agent to whom the customer was transferred. In this case, that agent can receive the co-browsing preview 710 and the new contact 715 can be added to the new agent's queue. The agent can select this new contact 715 and be presented with a menu 545 providing a set of options for taking action related to this customer contact as described above with reference to FIG. 5E. The session can then continue based on the agent selection of one of the options as described herein, i.e., selection of options including "Take as Chat" to initiate a chat session with the customer, "Take as Call" to initiate a voice call with the customer, or "Transfer" to transfer the customer to a different agent.

Figure 8:
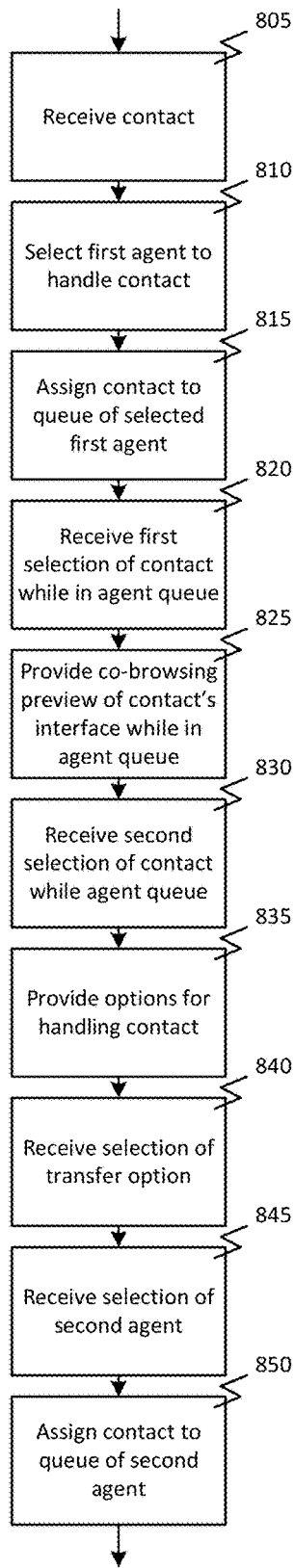
FIG. 8 is a flowchart illustrating a process for providing co-browsing previews of queued customer contacts in a chat scenario according to another embodiment of the present invention.

FIG. 8 is a flowchart illustrating a process for providing co-browsing previews of queued customer contacts in a chat scenario according to another embodiment of the present invention. As illustrated in this example, providing a co-browsing preview of a queued contact can comprise receiving 805 a contact from a customer, selecting 810 an agent from a plurality of agents based at least in part on the contact and a defined set of skills for each of the agents, and assigning 815 the contact to the selected agent. Assigning 815 the contact to the selected agent can comprise placing the contact into a queue for the selected agent. Upon receiving 820 a selection of the contact, e.g., by the agent clicking, hovering, or otherwise manipulating the user interface, a live, real-time co-browsing preview of a current user interface of the customer can be provided 825 to the selected agent while the contact is assigned to the selected agent's queue and before the customer is connected to the selected agent.

After the co-browsing preview has been provided 825, another selection of the contact, e.g., by again clicking, right-clicking, etc., from the queue for the selected agent can be received 830. In response to the selection and before initiating an interaction between the customer and the selected agent a set of options for handling the contact based on the live, real-time co-browsing preview can be provided 835 to the selected agent. The contact can then be handled based on one or more of the set of options. For example, the options can include a transfer option. In this case, handling the contact can further comprise receiving 840 a selection of the transfer option and in response to receiving 840 the selection of the transfer option, receiving 845 a selection of an agent of the plurality of agents other than the selected agent and assigning 850 the contact to the agent of the plurality of agents other than the selected agent.

Figure 9A:
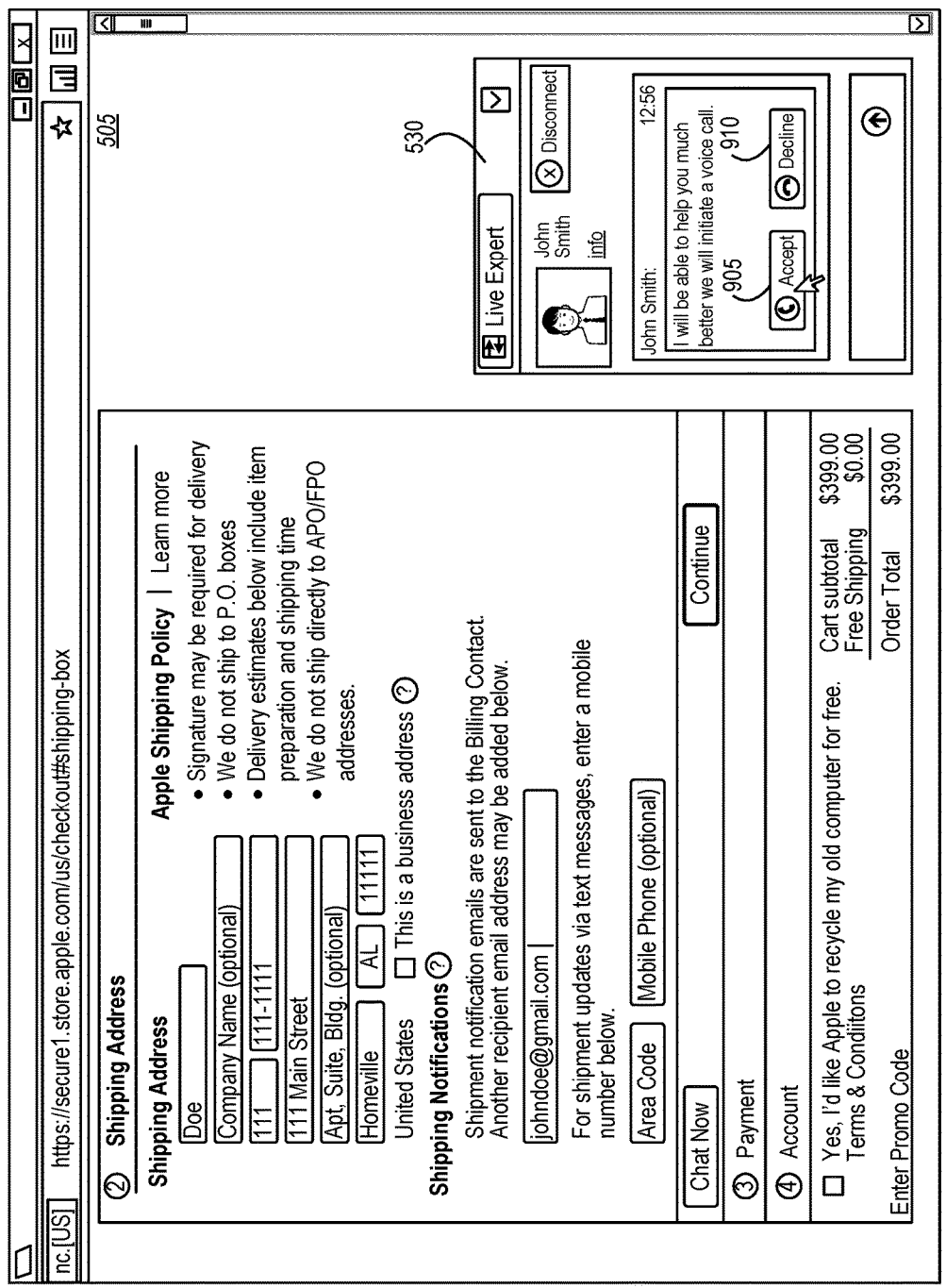
Figure 9B:
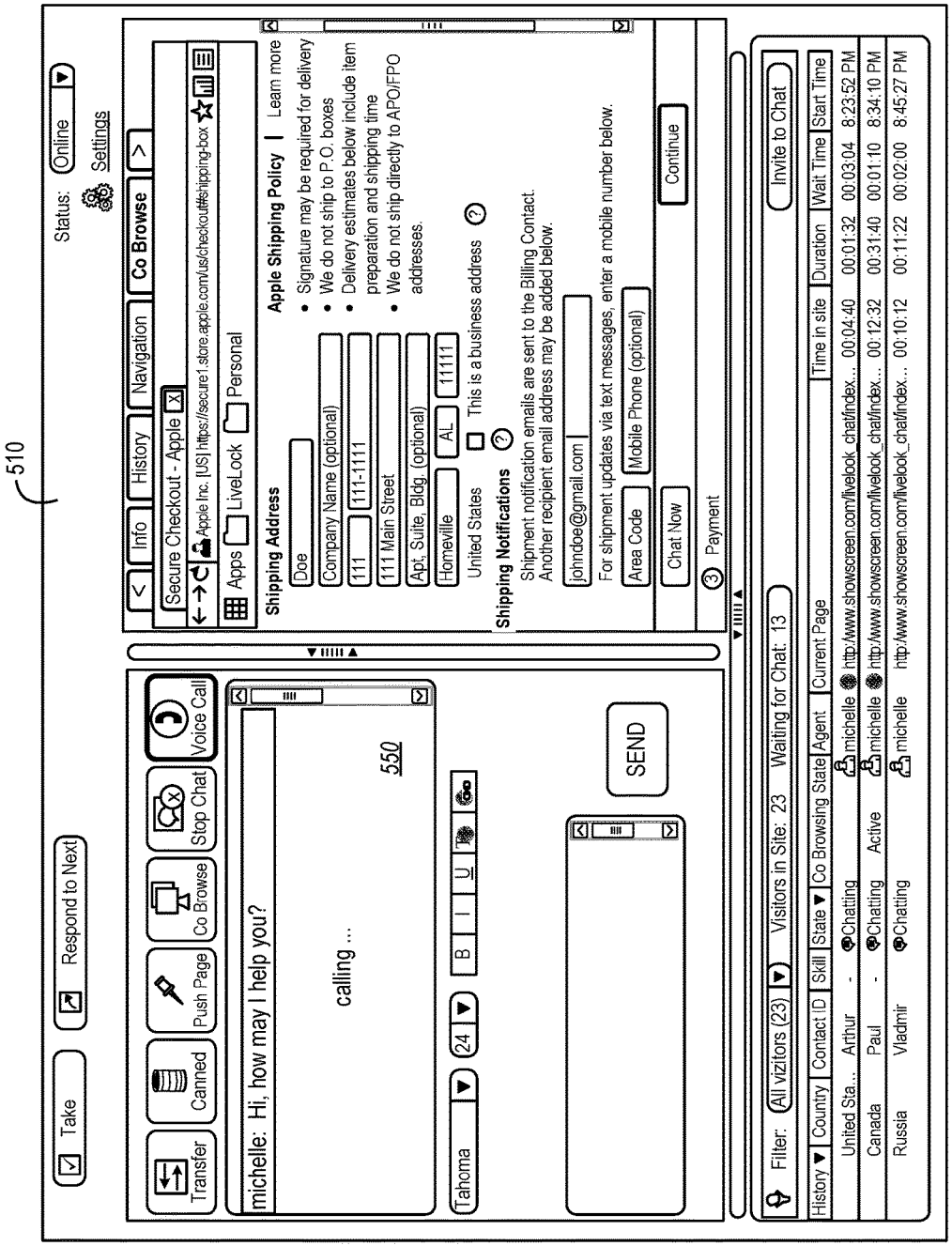
Figure 9C:
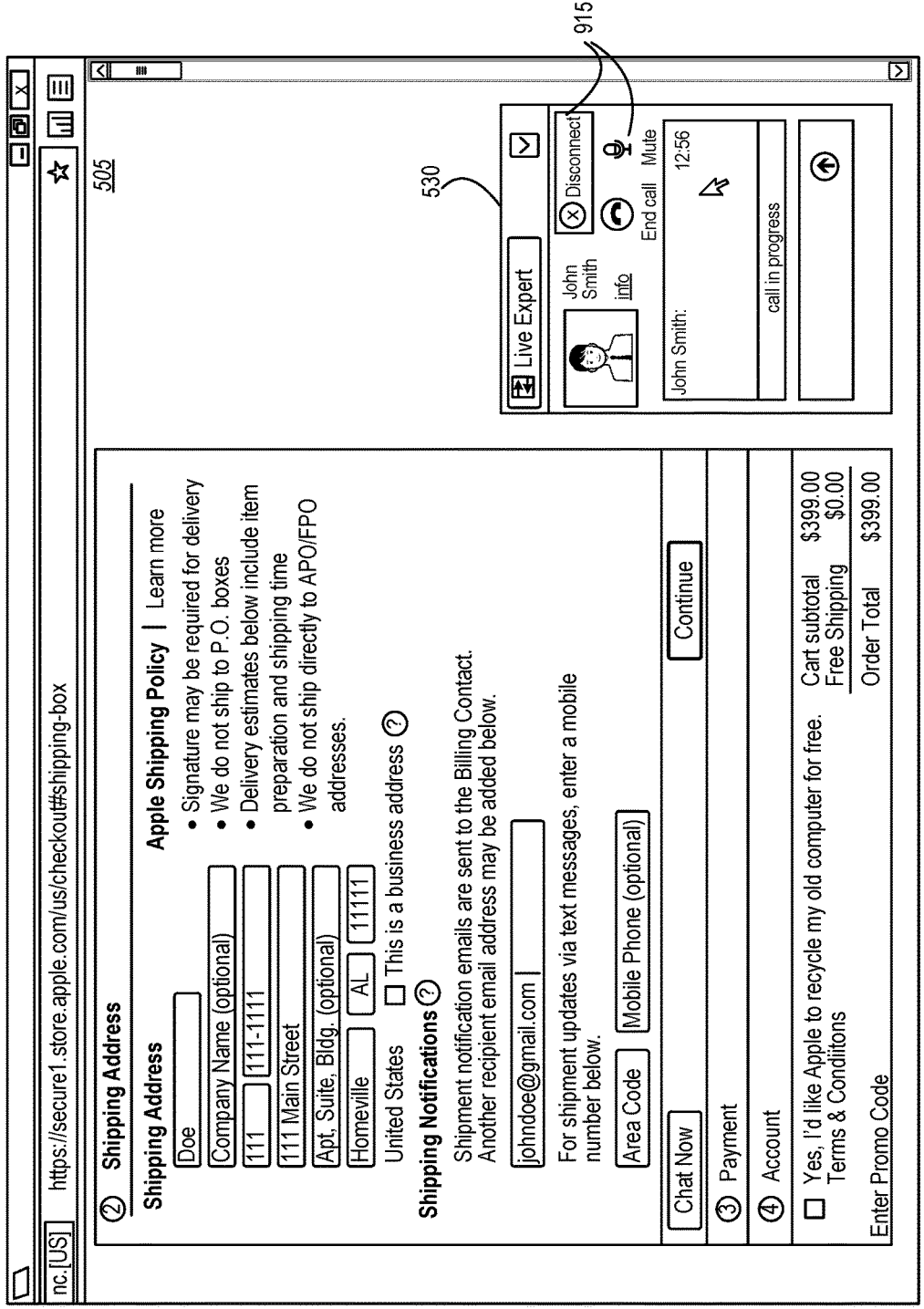
Figure 9D:
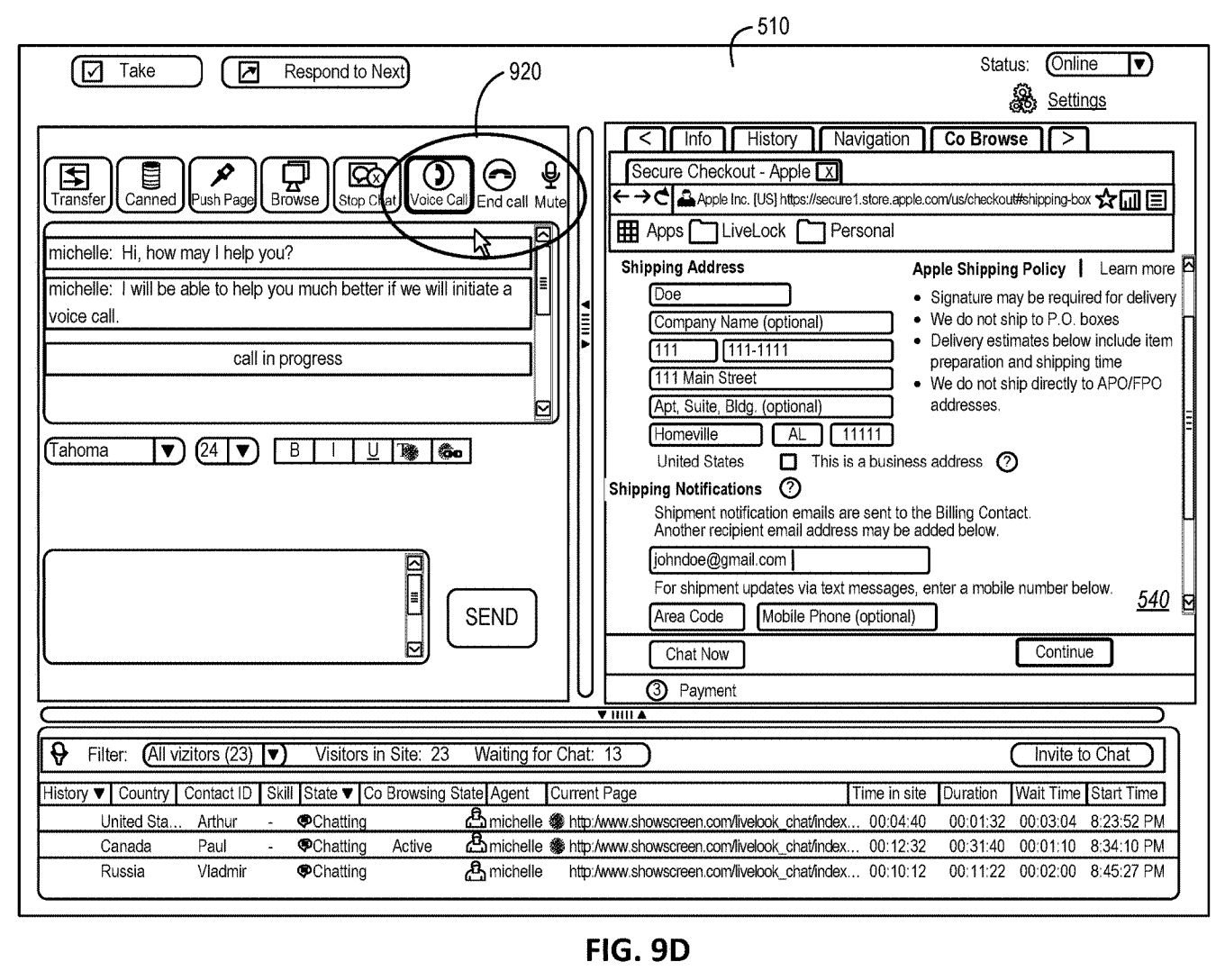

FIGS. 9A-9D are a series of screenshots illustrating exemplary user interfaces for providing co-browsing previews of queued customer contacts in a Voice over IP (VoIP) call scenario according to one embodiment of the present invention. In this case, the session can begin as described above with reference to FIGS. 5A-5D, i.e., with the customer requesting a chat session and the agent receiving a notification and preview of the customers view. However in this case, when the agent clicks on the new customer contact and is presented with the menu of options as illustrated in FIG. 5E, the agent selects the "Take as Call" option to connect to the customer with a voice call. In this case, the CRM system can check if the customer's device has VoIP capability. When VoIP calls are available to the customer's device and as illustrated in FIG. 9A, the chat box 530 of the customer view 505 can be updated to indicate the agent's request to connect a voice call and give the customer an options to accept 905 or decline 910 the call. As illustrated in FIG. 9B, the chat dialog 550 of the agent's console view 510 can be updated to indicate that the session is calling and waiting to connect to the customer. After the customer has accepted the voice call and the agent and customer have been connected, the chat box 530 in the customer's view 505 can be updated with controls 915 for muting, ending, or otherwise controlling the call as illustrated in FIG. 9C. Similarly and as illustrated in FIG. 9D, the agent's view 510 can be updated with controls 920 for muting, ending, or otherwise controlling the call. Additionally, the co-browsing preview 540 in the agent's console view 510 can be maintained through the call.

Figure 10:
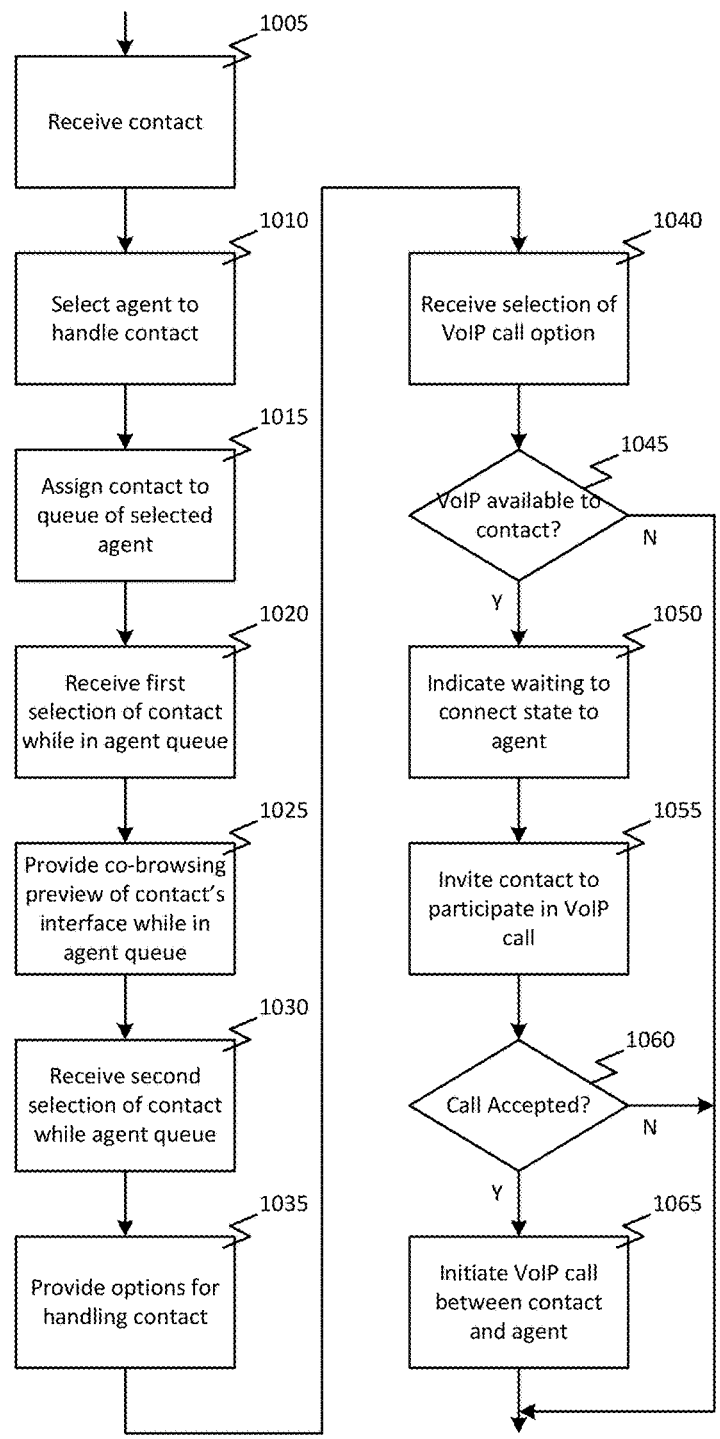
FIG. 10 is a flowchart illustrating a process for providing co-browsing previews of queued customer contacts in a Voice over IP (VoIP) call scenario according to another embodiment of the present invention.

FIG. 10 is a flowchart illustrating a process for providing co-browsing previews of queued customer contacts in a Voice over IP (VoIP) call scenario according to another embodiment of the present invention. As illustrated in this example, providing a co-browsing preview of a queued contact can comprise receiving 1005 a contact from a customer, selecting 1010 an agent from a plurality of agents based at least in part on the contact and a defined set of skills for each of the agents, and assigning 1015 the contact to the selected agent. Assigning 1015 the contact to the selected agent can comprise placing the contact into a queue for the selected agent. Upon receiving 1020 a selection of the contact, e.g., by the agent clicking, hovering, or otherwise manipulating the user interface, a live, real-time co-browsing preview of a current user interface of the customer can be provided 1025 to the selected agent while the contact is assigned to the selected agent's queue and before the customer is connected to the selected agent.

After the co-browsing preview has been provided 1025, another selection of the contact, e.g., by again clicking, right-clicking, etc., from the queue for the selected agent can be received 1030. In response to the selection and before initiating an interaction between the customer and the selected agent a set of options for handling the contact based on the live, real-time co-browsing preview can be provided 1035 to the selected agent. The contact can then be handled based on one or more of the set of options. For example, the options can include an option to conduct a VoIP call. In this case, handling the contact can further comprise receiving 1040 a selection of the VoIP call option and in response to receiving 1040 the selection of the VoIP call option, a determination 1045 can be made as to whether VoIP calling is available to the customer. In response to determining 1045 VoIP calling is available to the customer, a waiting state can be indicated 1050 to the agent and the customer can be invited 1055 to participate in a VoIP call. In response to the invitation being accepted, the VoIP call between the customer and the agent can be initiated 1065 and conducted while maintaining the co-browsing preview.

Figure 11A:
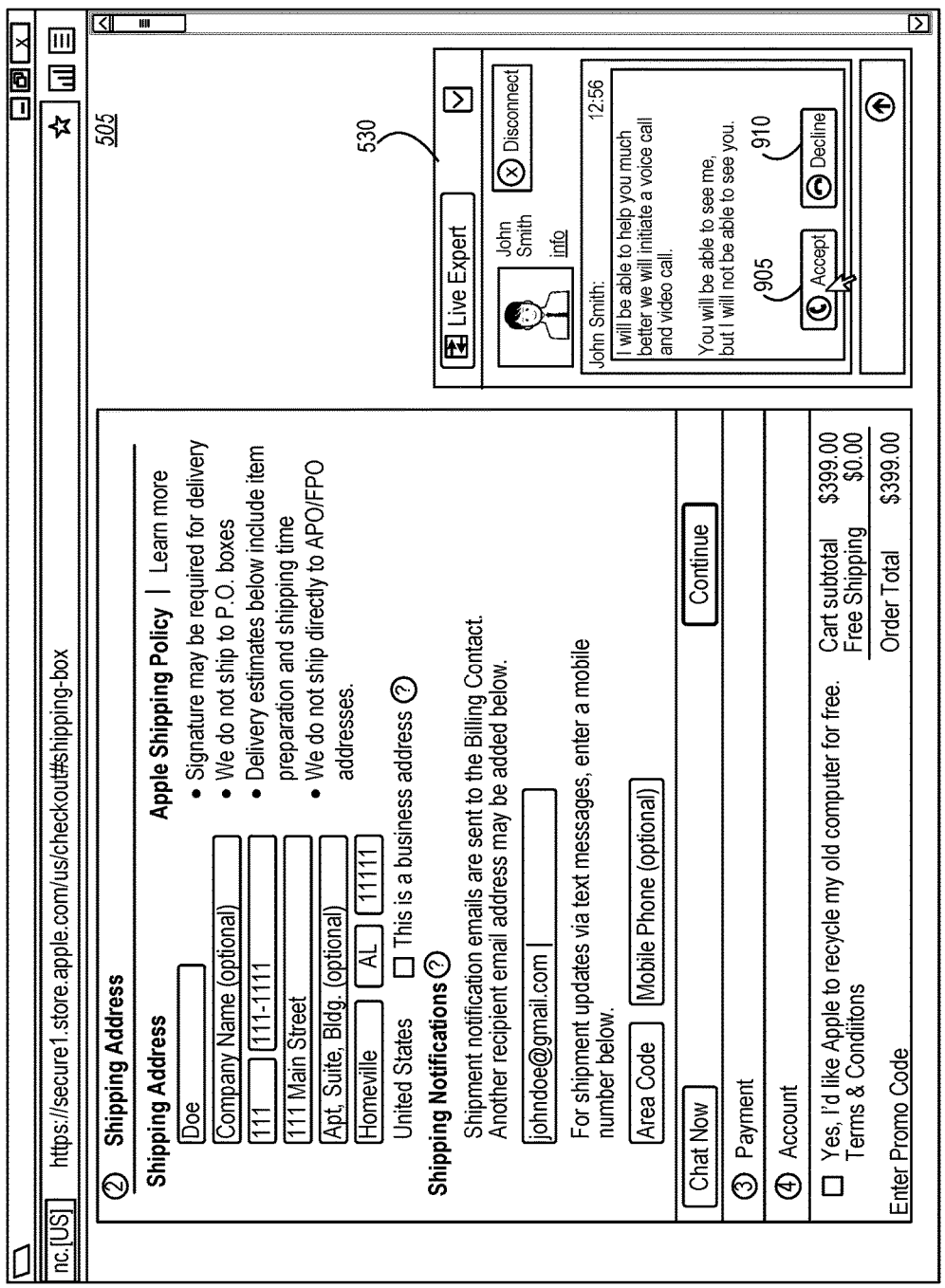
FIGS. 11A-11D are a series of screenshots illustrating exemplary user interfaces for providing co-browsing previews of queued customer contacts in a VoIP call with video scenario according to one embodiment of the present invention.
Figure 11B:
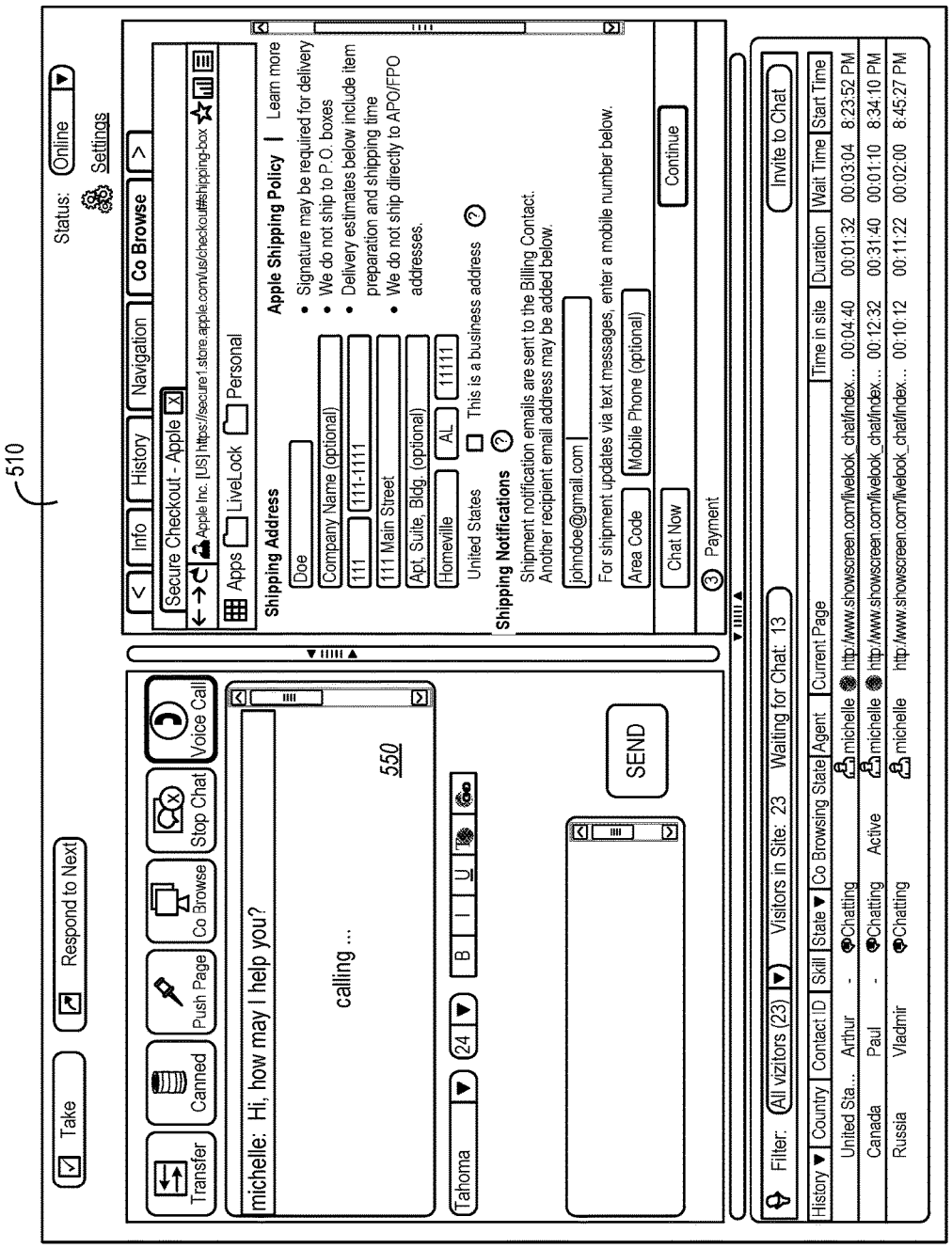
Figure 11C:
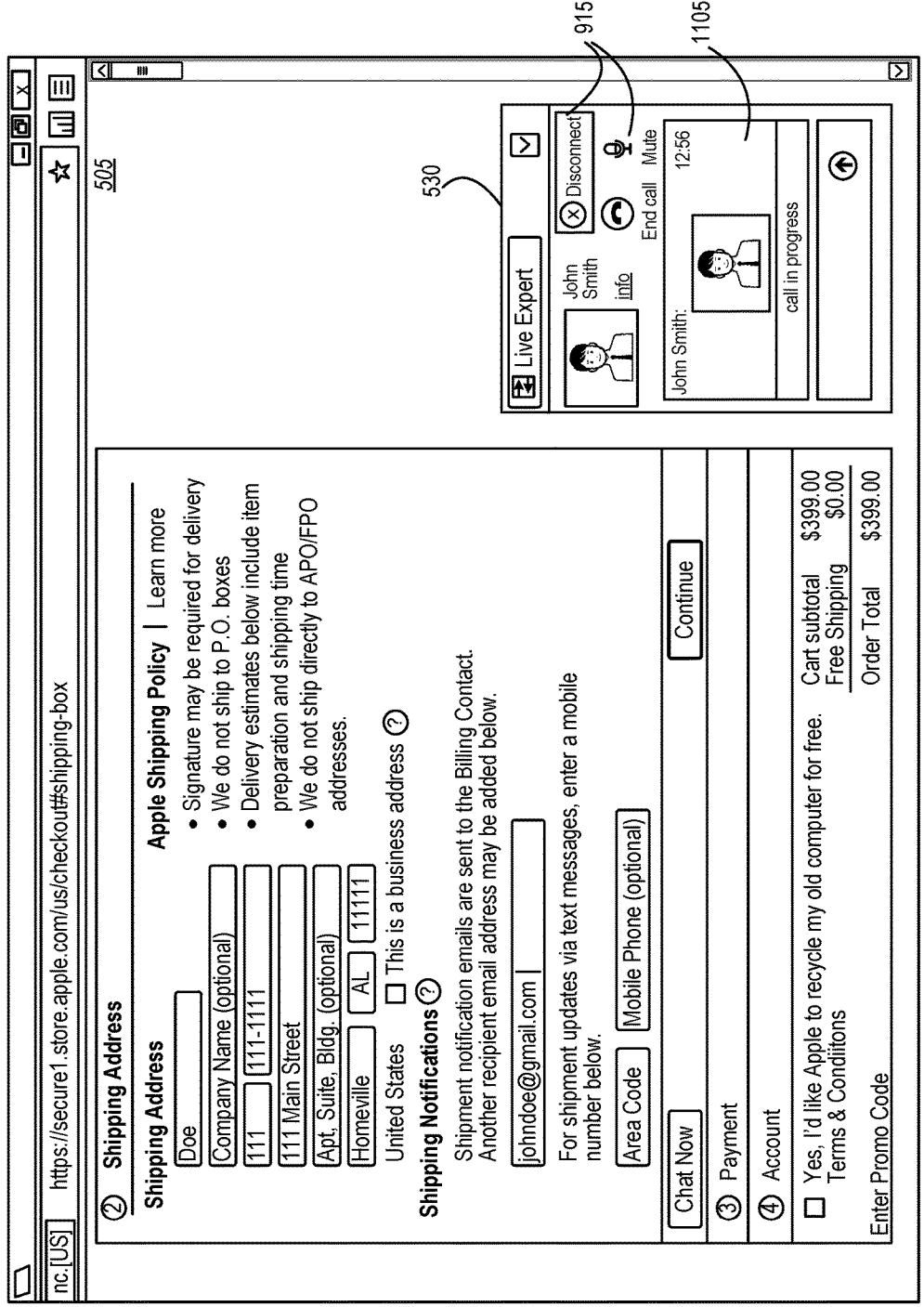
Figure 11D:
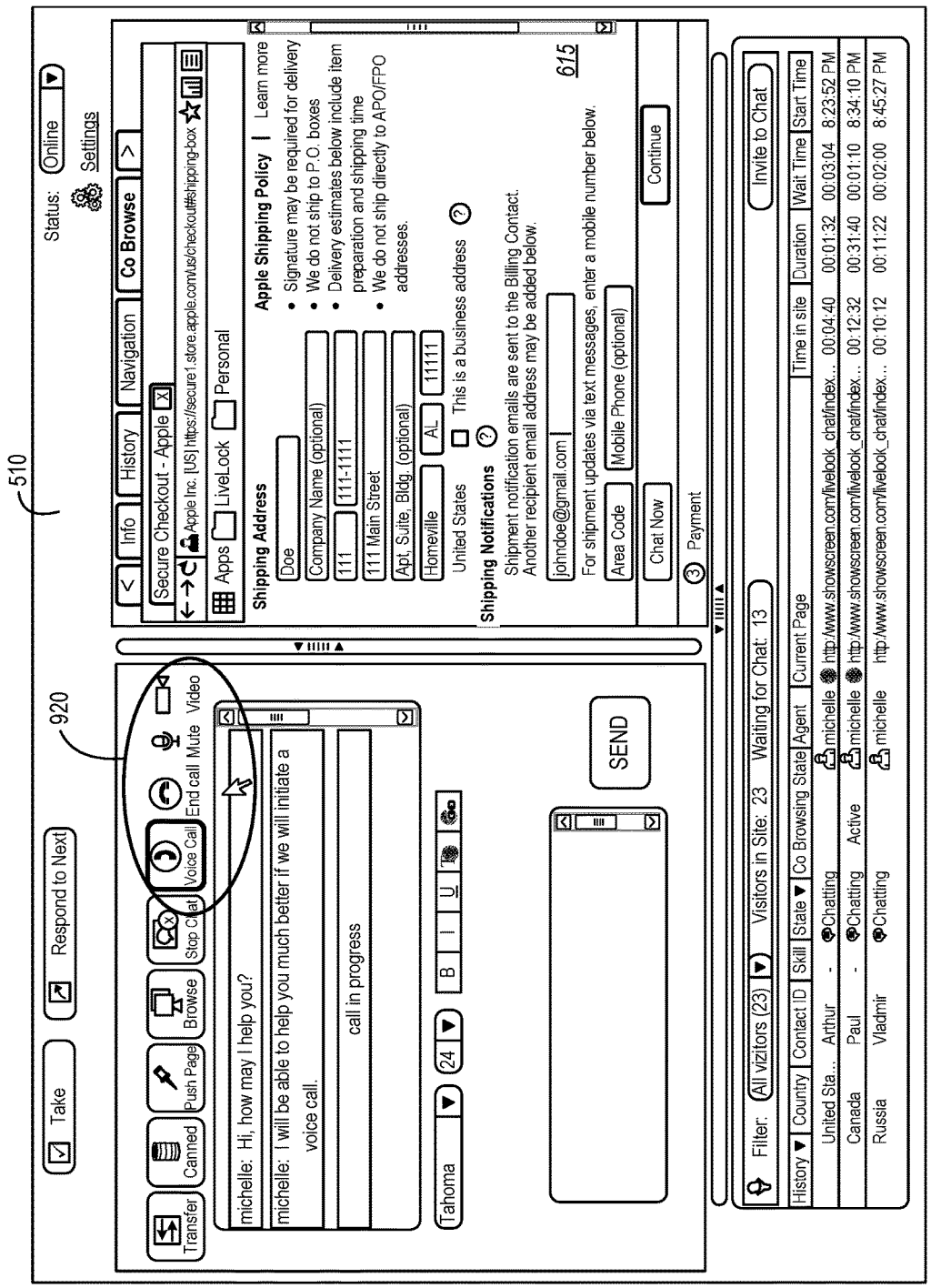

FIGS. 11A-11D are a series of screenshots illustrating exemplary user interfaces for providing co-browsing previews of queued customer contacts in a VoIP call with video scenario according to one embodiment of the present invention. In this case, the session can begin as described above with reference to FIGS. 5A-5D, i.e., with the customer requesting a chat session and the agent receiving a notification and preview of the customers view. When the agent clicks on the new customer contact and is presented with the menu of options as illustrated in FIG. 5E, the agent selects the "Take as Call" option to connect to the customer with a voice call. The CRM system can check if the customer's device has VoIP capability and video capability. As illustrated in FIG. 11A, the chat box 530 of the customer view 505 can be updated to indicate the agent's request to connect a voice call with video, inform the customer that this is one-way video, i.e., that the customer can see the agent but that the agent will not be able to see the customer, and give the customer an option to accept 905 or decline 910 the call. As illustrated in FIG. 11B, the chat dialog 550 of the agent's console view 510 can be updated to indicate that the session is calling and waiting to connect to the customer. After the customer has accepted the voice call and the agent and customer have been connected, the chat box 530 in the customer's view 505 can be updated to present the one way video 1105 and provide controls 915 for muting, ending, or otherwise controlling the call as illustrated in FIG. 11C. Similarly and as illustrated in FIG. 11D, the agent's view 510 can be updated with controls 920 for muting, ending, or otherwise controlling the call. Additionally, the co-browsing preview 540 in the agent's console view 510 can be maintained through the call.

Figure 12:
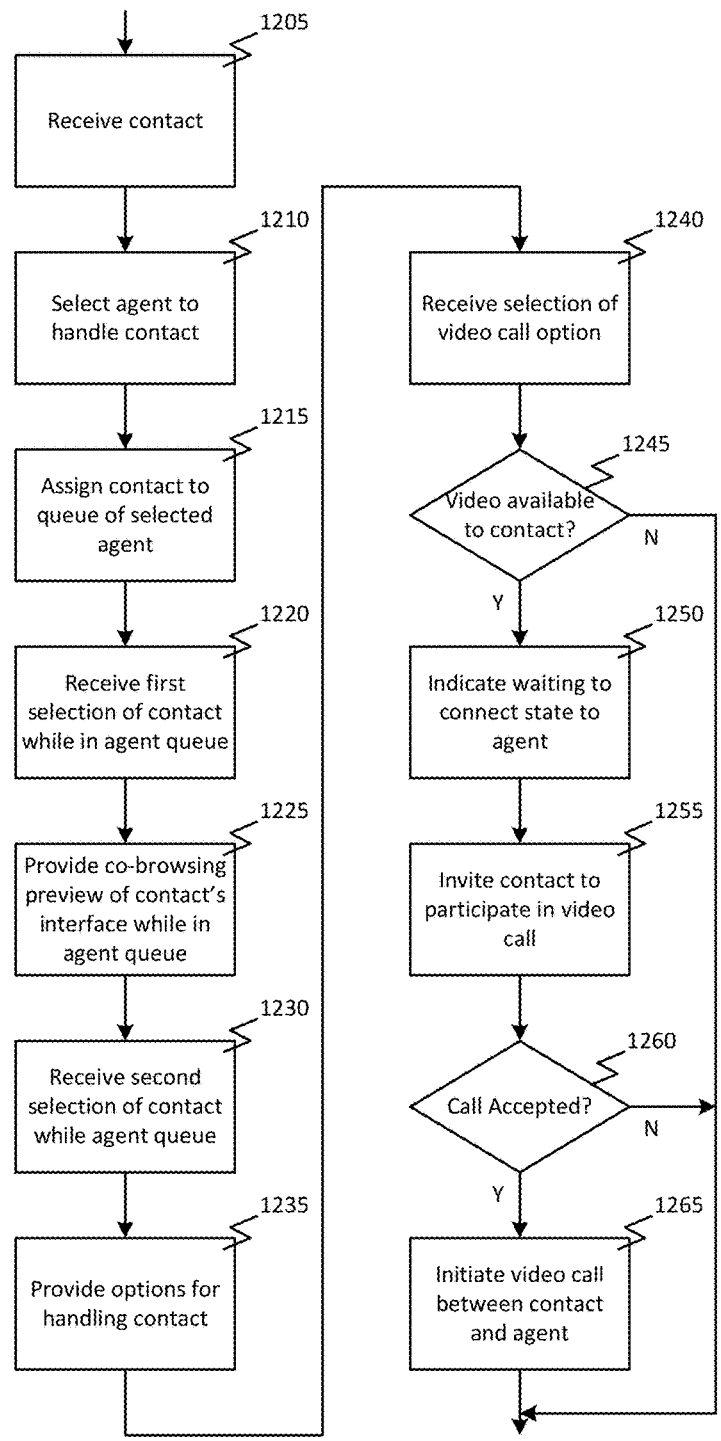
FIG. 12 is a flowchart illustrating a process for providing co-browsing previews of queued customer contacts in a VoIP call with video scenario according to another embodiment of the present invention.

FIG. 12 is a flowchart illustrating a process for providing co-browsing previews of queued customer contacts in a VoIP call with video scenario according to another embodiment of the present invention. As illustrated in this example, providing a co-browsing preview of a queued contact can comprise receiving 1205 a contact from a customer, selecting 1210 an agent from a plurality of agents based at least in part on the contact and a defined set of skills for each of the agents, and assigning 1215 the contact to the selected agent. Assigning 1215 the contact to the selected agent can comprise placing the contact into a queue for the selected agent. Upon receiving 1220 a selection of the contact, e.g., by the agent clicking, hovering, or otherwise manipulating the user interface, a live, real-time co-browsing preview of a current user interface of the customer can be provided 1225 to the selected agent while the contact is assigned to the selected agent's queue and before the customer is connected to the selected agent.

After the co-browsing preview has been provided 1225, another selection of the contact, e.g., by again clicking, right-clicking, etc., from the queue for the selected agent can be received 1230. In response to the selection and before initiating an interaction between the customer and the selected agent a set of options for handling the contact based on the live, real-time co-browsing preview can be provided 1235 to the selected agent. The contact can then be handled based on one or more of the set of options. For example, the options can include an option to conduct a video call. In this case, handling the contact can further comprise receiving 1240 a selection of the video call option and in response to receiving 1240 the selection of the video call option, a determination 1245 can be made as to whether video calling is available to the customer. In response to determining 1245

VoIP calling is available to the customer, a waiting state can be indicated 1250 to the agent and the customer can be invited 1255 to participate in a video call. In response to the invitation being accepted, the video call between the customer and the agent can be initiated 1265 and conducted while maintaining the co-browsing preview.

Figure 13A:
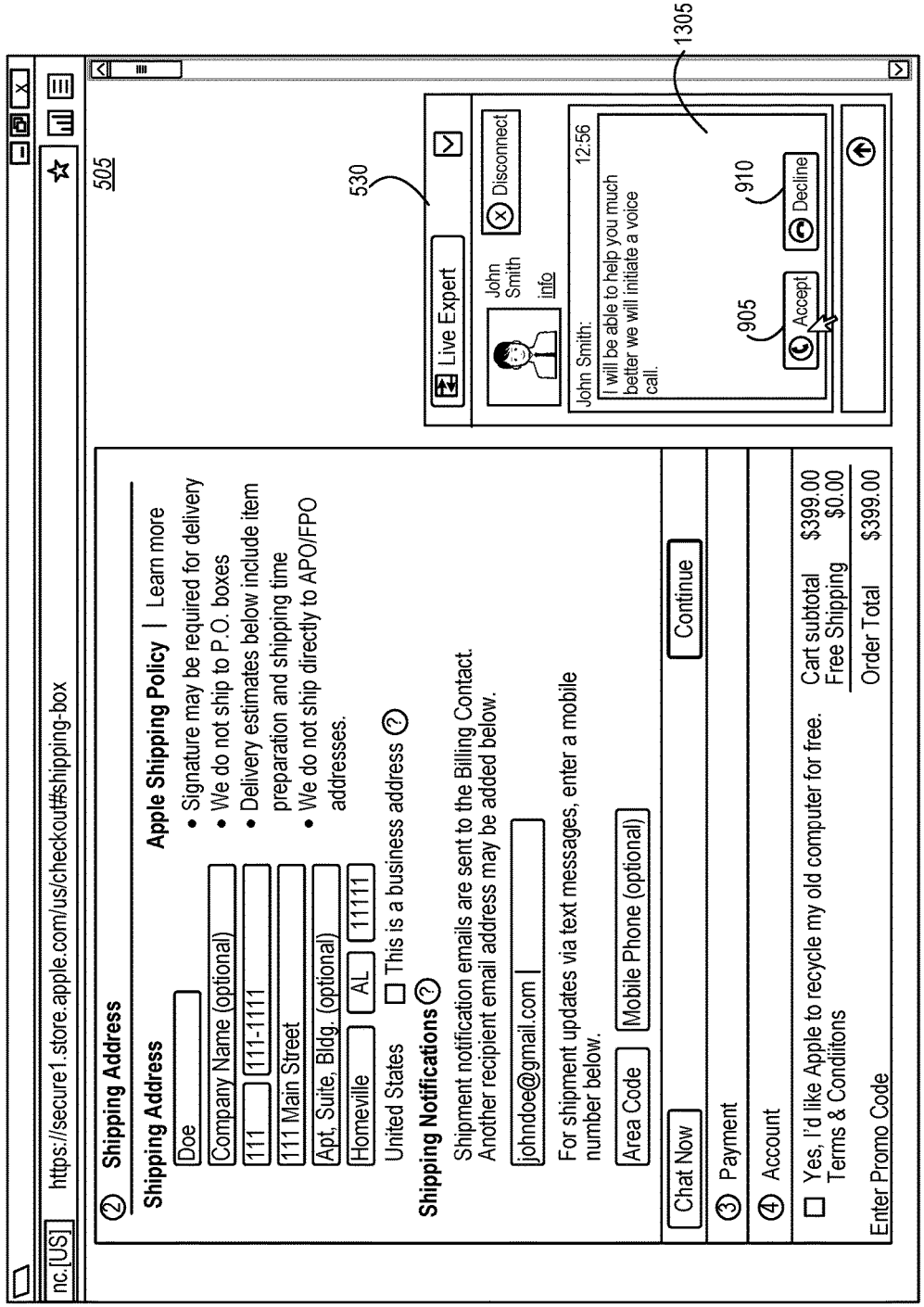
FIGS. 13A-13E are a series of screenshots illustrating exemplary user interfaces for providing co-browsing previews of queued customer contacts in a call over PSTN scenario according to one embodiment of the present invention.
Figure 13B:
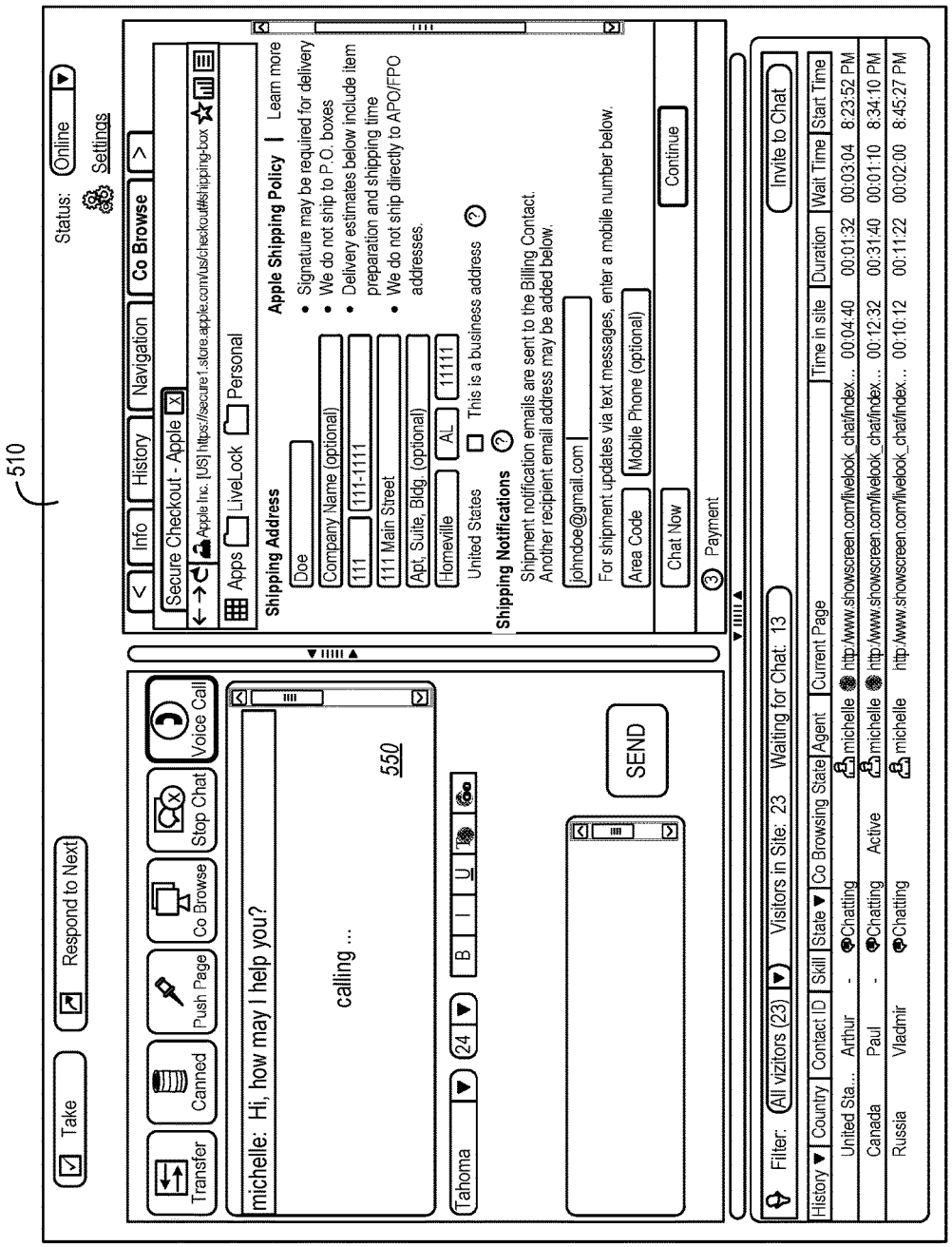
Figure 13C:
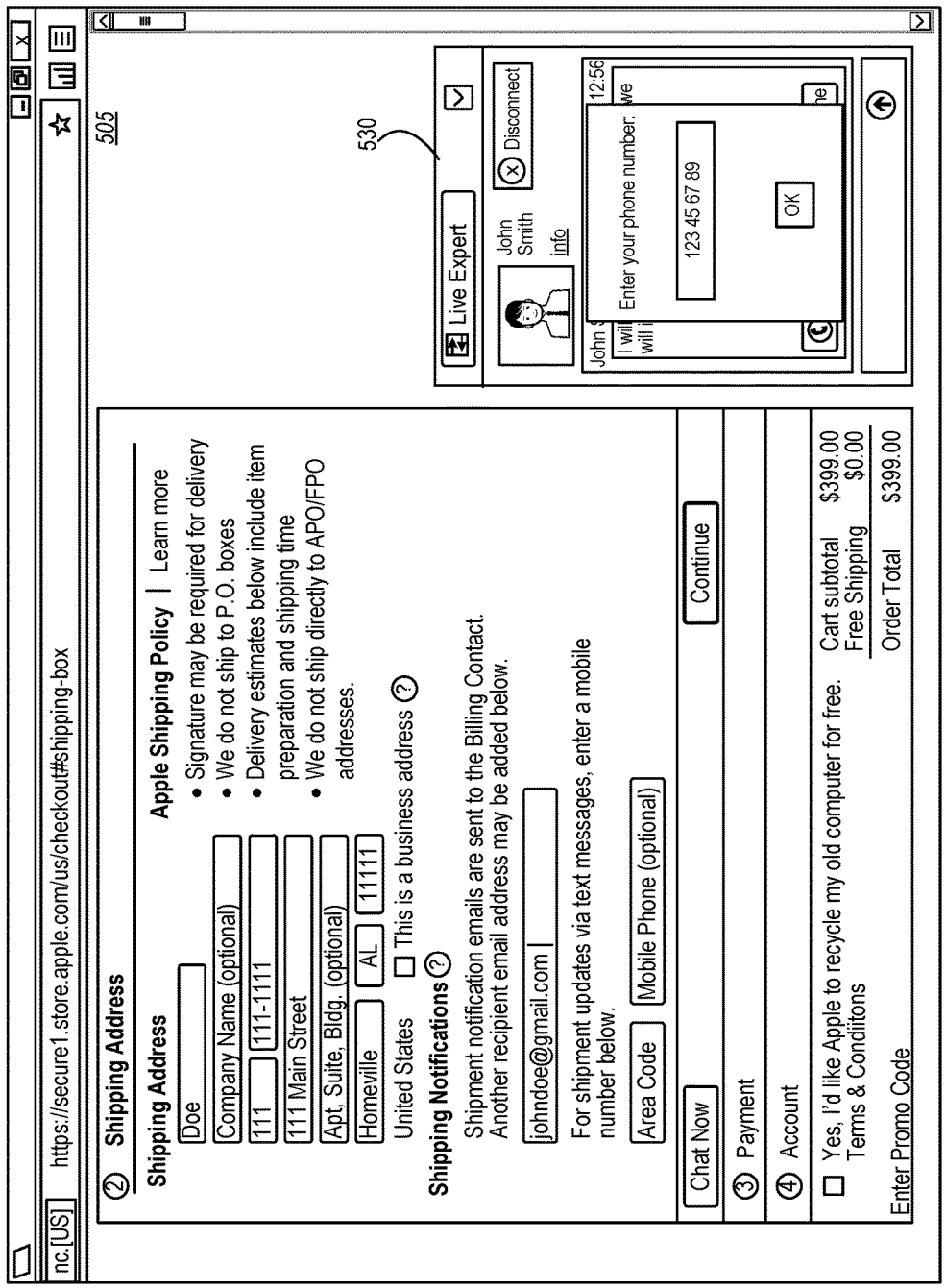
Figure 13D:
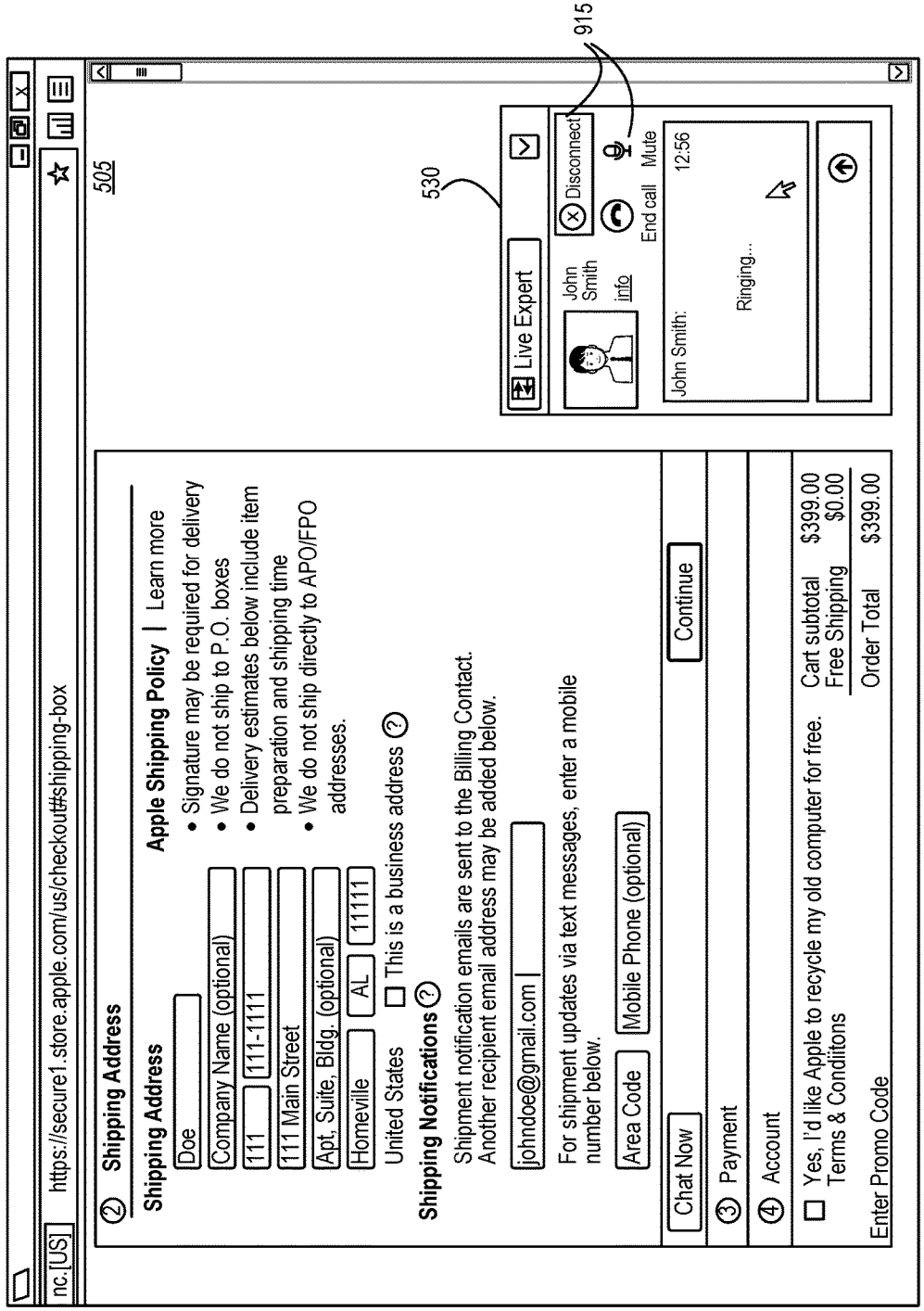
Figure 13E:
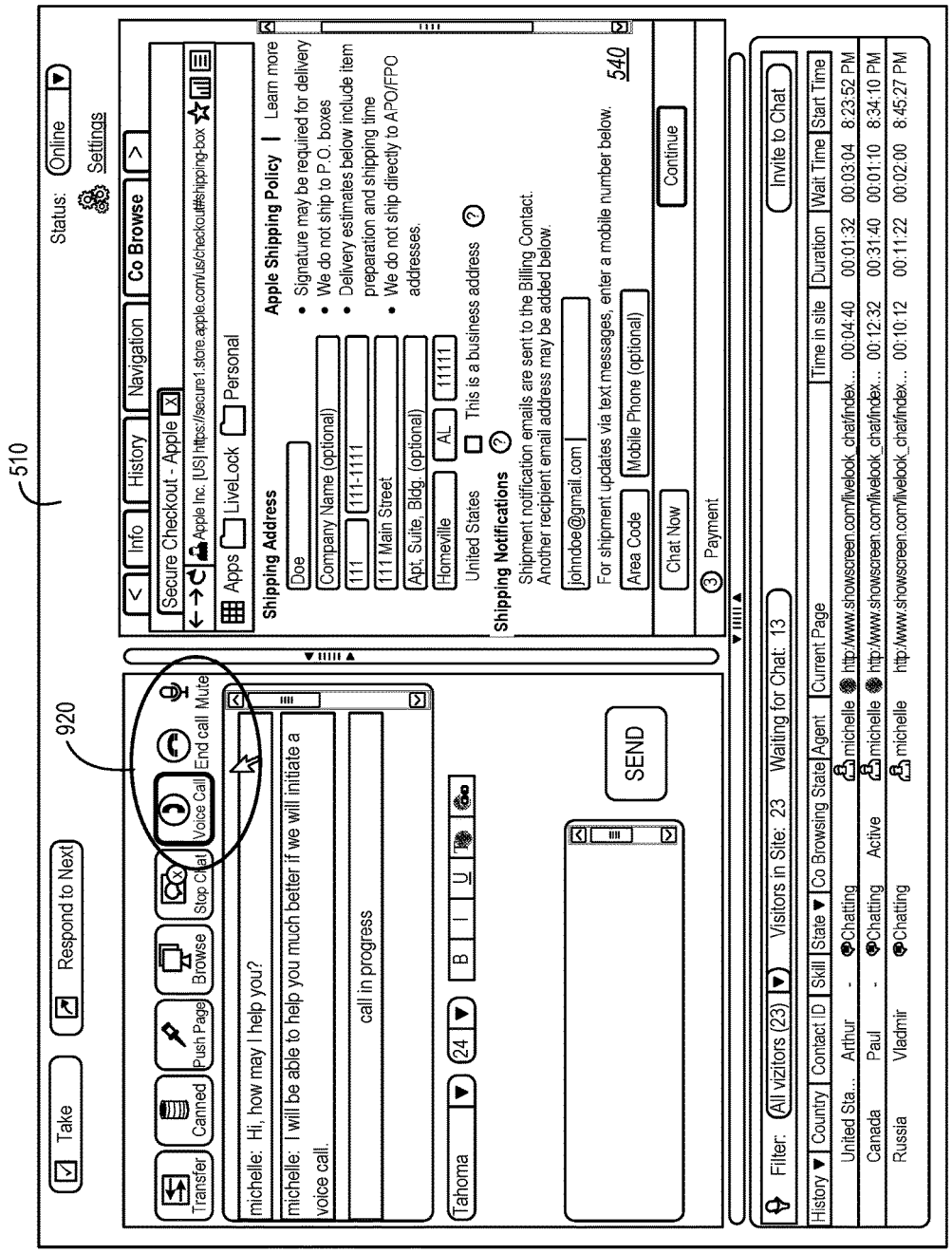

FIGS. 13A-13E are a series of screenshots illustrating exemplary user interfaces for providing co-browsing previews of queued customer contacts in a call over PSTN scenario according to one embodiment of the present invention. In this case, the session can begin as described above with reference to FIGS. 5A-5D, i.e., with the customer requesting a chat session and the agent receiving a notification and preview of the customers view. When the agent clicks on the new customer contact and is presented with the menu of options as illustrated in FIG. 5E, the agent selects the "Take as Call" option to connect to the customer with a voice call. The CRM system can check if the customer's device has VoIP capability. If not, an attempt can be made to connect the voice call over a Public Switched Telephone Network (PSTN). As illustrated in FIG. 13A, the chat box 530 of the customer view 505 can be updated to indicate the agent's request 1305 to connect a voice call and give the customer an option to accept 905 or decline 910 the call. As illustrated in FIG. 13B, the chat dialog 550 of the agent's console view 510 can be updated to indicate that the session is calling and waiting to connect to the customer. After the customer has accepted the voice call and as illustrated in FIG. 13C, the customer can be prompted through the chat box 530 of the customer's view 505 to provide his telephone number so that the agent can call him over the PSTN. Once the customer enters his number a call can be initiated. For example, FIG. 13D shows the chat box 530 in the customer's view 505 updated to indicate the call is being placed and to include controls 1305 for controlling the call. FIG. 13E illustrates the agent's console 510 updated with controls 905 for muting, ending, or otherwise controlling the call. Additionally, the co-browsing 540 of the customer's view presented in the agent's console view 510 can continue.

Figure 14:
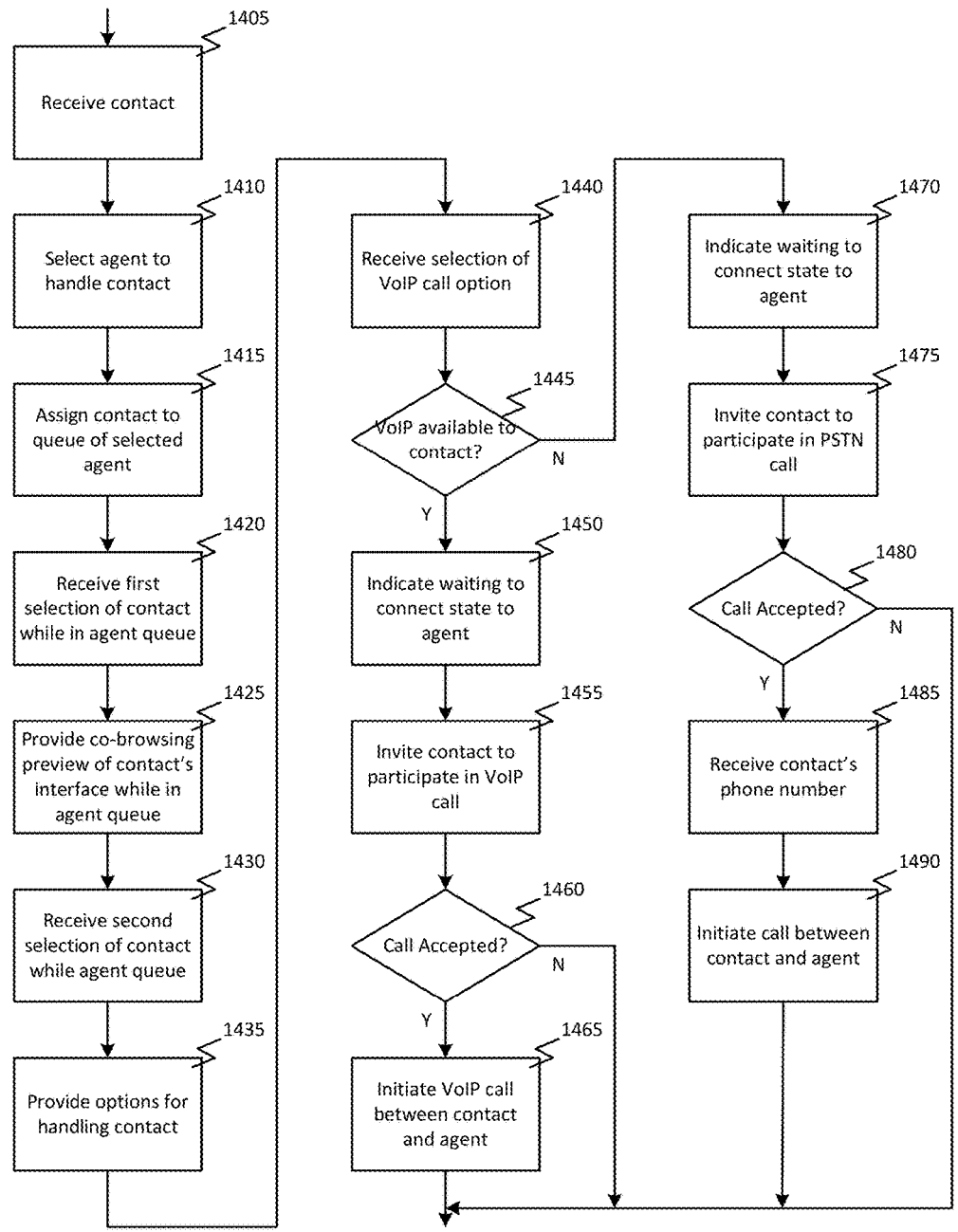
FIG. 14 is a flowchart illustrating a process for providing co-browsing previews of queued customer contacts in a call over PSTN scenario according to another embodiment of the present invention.

FIG. 14 is a flowchart illustrating a process for providing co-browsing previews of queued customer contacts in a call over PSTN scenario according to another embodiment of the present invention. As illustrated in this example, providing a co-browsing preview of a queued contact can comprise receiving 1405 a contact from a customer, selecting 1410 an agent from a plurality of agents based at least in part on the contact and a defined set of skills for each of the agents, and assigning 1415 the contact to the selected agent. Assigning 1415 the contact to the selected agent can comprise placing the contact into a queue for the selected agent. Upon receiving 1420 a selection of the contact, e.g., by the agent clicking, hovering, or otherwise manipulating the user interface, a live, real-time co-browsing preview of a current user interface of the customer can be provided 1425 to the selected agent while the contact is assigned to the selected agent's queue and before the customer is connected to the selected agent.

After the co-browsing preview has been provided 1425, another selection of the contact, e.g., by again clicking, right-clicking, etc., from the queue for the selected agent can be received 1430. In response to the selection and before initiating an interaction between the customer and the selected agent a set of options for handling the contact based on the live, real-time co-browsing preview can be provided 1435 to the selected agent. The contact can then be handled based on one or more of the set of options. For example, the options can include an option to conduct a VoIP call. In this case, handling the contact can further comprise receiving 1440 a selection of the VoIP call option and in response to receiving 1040 the selection of the VoIP call option, a determination 1445 can be made as to whether VoIP calling is available to the customer. In response to determining 1445 VoIP calling is available to the customer, a waiting state can be indicated 1450 to the agent and the customer can be invited 1455 to participate in a VoIP call. In response to the invitation being accepted, the VoIP call between the customer and the agent can be initiated 1465 and conducted while maintaining the co-browsing preview.

In response to determining 1445 VoIP calling is not available to the customer, a waiting state can be indicated 1470 to the agent and the customer can be invited 1475 to participate in a Public Switched Telephone Network (PSTN) call. In response to the invitation being accepted 1480, a contact telephone number for the customer can be received 1485 and the PSTN call between the customer and the agent can be initiated 1490 and conducted while maintaining the co-browsing preview.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums or memory devices, such as CD-ROMs or other type of optical disks, floppy diskettes, ROMs, RAMs, EPROMs, EEPROMs, magnetic or optical cards, flash memory, or other types of machine-readable mediums or memory devices suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for providing a co-browsing preview of a queued contact, the method comprising:
   receiving, at a Customer Relationship Management (CRM) system, a contact from a customer, the contact being initiated through a user interface within a browser window;
   selecting, by the CRM system, an agent from a plurality of agents based at least in part on the contact and a defined set of skills for each of the agents;
   assigning, by the CRM system, the contact to the selected agent, wherein assigning the contact to the selected agent comprises placing the contact into a queue for the selected agent;
   providing, by the CRM system, a graphical user interface to a device of the selected agent, the graphical user interface comprising:
   a first region comprising a representation of the queue for the selected agent,
   a second region comprising a display interface for conducting a session with one or more contacts in the queue, and a third region comprising a co-browsing display interface for co-browsing with the one or more contacts in the queue;

receiving, by the CRM system, a first selection of the contact via the graphical user interface;

in response to the first selection of the contact, providing, by the CRM system via the graphical user interface, a live, real-time co-browsing preview of the browser window to the third region of the graphical user interface while the contact is assigned to the selected agent's queue and before the customer is connected to interact with the selected agent and the customer is waiting for the selected agent to begin the session, wherein the live, real-time co-browsing preview is a current view of the browser window of the customer such that the selected agent can share the same view the customer has of the browser window;

receiving, by the CRM system, a second selection of the contact via the graphical user interface;

in response to the second selection of the contact, providing, by the CRM system via the graphical user interface, a selectable list of options for handling the contact, wherein the selectable list of options comprises a transfer option, a connect via chat option, and a connect via call option; and receiving, by the CRM system from the graphical user interface, an option selection from the selectable list of options.

2. The method of claim 1, further comprising:

handling, by the CRM system, the contact based on the received option selection.

3. The method of claim 2, wherein the option selection is the connect via chat option and wherein handling the contact further comprises:

in response to receiving the selection of the connect via chat option, initiating a chat session between the customer and the selected agent in the second region of the graphical user interface.

4. The method of claim 2, wherein the option selection is the transfer option and wherein handling the contact further comprises:

receiving a selection of a transfer agent, the transfer agent being selected from the plurality of agents other than the selected agent; and in response to receiving the selection of the transfer option and the selection of the transfer agent, assigning the contact to a queue of the transfer agent.

5. The method of claim 2, wherein the option selection is the connect via call option and wherein handling the contact further comprises:

in response to receiving the selection of the connect via call option, further determining whether Voice over Internet Protocol ("VoIP") calling is available to the customer, in response to determining VoIP calling is available to the customer, indicating a waiting state to the selected agent, inviting the customer to participate in a VoIP call, and in response to the invitation being accepted, initiating the VoIP call between the customer and the selected agent while maintaining the co-browsing preview.

6. The method of claim 2, wherein the selectable list of options further comprises a video call option and wherein the option selection is the video call option and wherein handling the contact further comprises:

in response to receiving the selection of the video call option, further determining whether video calling is available to the customer, in response to determining video calling is available to the customer, indicating a waiting state to the selected agent, inviting the customer to participate in a video call, and in response to the invitation being accepted, initiating the video call between the customer and the selected agent while maintaining the co-browsing preview.

7. The method of claim 5, further comprising, in response to determining VoIP calling is not available to the customer:

indicating a waiting state to the selected agent;

inviting the customer to participate in a Public Switched Telephone Network (PSTN) call; and in response to the invitation being accepted, receiving a contact telephone number for the customer and initiating the PSTN call between the customer and the selected agent while maintaining the co-browsing preview.

8. A system comprising:

a processor; and a memory coupled with and readable by the processor and storing therein a set of instructions which, when executed by the processor, causes the processor to provide a co-browsing preview of a queued contact by:

receiving a contact from a customer, the contact being initiated through a user interface within a browser window;

selecting an agent from a plurality of agents based at least in part on the contact and a defined set of skills for each of the agents;

assigning the contact to the selected agent, wherein assigning the contact to the selected agent comprises placing the contact into a queue for the selected agent;

providing a graphical user interface to a device of the selected agent, the graphical user interface comprising:

a first region comprising a representation of the queue for the selected agent, a second region comprising a session display interface for conducting a session with one or more contacts in the queue, and a third region comprising a co-browsing display interface for co-browsing with the one or more contacts in the queue;

receiving a first selection of the contact via the graphical user interface;

in response to the first selection of the contact, providing, via the graphical user interface, a live, real-time co-browsing preview of the browser window to the third region of the graphical user interface while the contact is assigned to the selected agent's queue and before the customer is connected to interact with the selected agent and the customer is waiting for the selected agent to begin the session, wherein the live, real-time co-browsing preview is a current view of the browser window of the customer such that the selected agent can share the same view the customer has of the browser window;

receiving a second selection of the contact via the graphical user interface;

in response to the second selection of the contact, providing, via the graphical user interface, a selectable list of options for handling the contact, wherein the selectable list of options comprises a transfer option, a connect via chat option, and a connect via call option; and receiving, from the graphical user interface, an option selection from the selectable list of options.

9. The system of claim 8, wherein the memory stores further instructions which, when executed by the processor, causes the processor to provide a co-browsing preview of a queued contact by:

handling the contact based on the received option selection.

10. The system of claim 9, wherein the option selection is the connect via chat option and wherein handling the contact further comprises:

in response to receiving the selection of the connect via chat option, initiating a chat session between the customer and the selected agent in the second region of the graphical user interface.

11. The system of claim 9, wherein the option selection is the transfer option and wherein handling the contact further comprises:

receiving a selection of a transfer agent, the transfer agent being selected from the plurality of agents other than the selected agent; and in response to receiving the selection of the transfer option and the selection of the transfer agent, assigning the contact to a queue of the transfer agent.

12. The system of claim 9, wherein the option selection is the connect via call option and wherein handling the contact further comprises:

in response to receiving the selection of the connect via call option, further determining whether Voice over Internet Protocol ("VoIP") calling is available to the customer, in response to determining VoIP calling is available to the customer, indicating a waiting state to the selected agent, inviting the customer to participate in a VoIP call, and in response to the invitation being accepted, initiating the VoIP call between the customer and the selected agent while maintaining the co-browsing preview.

13. The system of claim 9, wherein the selectable list of options further comprises a video call option and wherein the option selection is the video call option and wherein handling the contact further comprises:

in response to receiving the selection of the video call option, further determining whether video calling is available to the customer, in response to determining video calling is available to the customer, indicating a waiting state to the selected agent, inviting the customer to participate in a video call, and in response to the invitation being accepted, initiating the video call between the customer and the selected agent while maintaining the co-browsing preview.

14. The system of claim 12, wherein the memory stores further instructions which, when executed by the processor, causes the processor to provide a co-browsing preview of a queued contact by, in response to determining VoIP calling is not available to the customer:

indicating a waiting state to the selected agent;

inviting the customer to participate in a Public Switched Telephone Network (PSTN) call; and in response to the invitation being accepted, receiving a contact telephone number for the customer and initiating the PSTN call between the customer and the selected agent while maintaining the co-browsing preview.

15. A non-transitory, computer-readable memory comprising a set of instructions stored therein which, when executed by a processor, causes the processor to provide a co-browsing preview of a queued contact by:

receiving a contact from a customer, the contact being initiated through a user interface within a browser window;

selecting an agent from a plurality of agents based at least in part on the contact and a defined set of skills for each of the agents;

assigning the contact to the selected agent, wherein assigning the contact to the selected agent comprises placing the contact into a queue for the selected agent;

providing a graphical user interface to a device of the selected agent, the graphical user interface comprising:

a first region comprising a representation of the queue for the selected agent, a second region comprising a session display interface for conducting a session with one or more contacts in the queue, and a third region comprising a co-browsing display interface for co-browsing with the one or more contacts in the queue;

receiving a first selection of the contact via the graphical user interface;

in response to the first selection of the contact, providing, via the graphical user interface, a live, real-time co-browsing preview of the browser window to the third region of the graphical user interface while the contact is assigned to the selected agent's queue and before the customer is connected to interact with the selected agent and the customer is waiting for the selected agent to begin the session, wherein the live, real-time co-browsing preview is a current view of the browser window of the customer such that the selected agent can share the same view the customer has of the browser window;

receiving a second selection of the contact via the graphical user interface;

in response to the second selection of the contact, providing, via the graphical user interface, a selectable list of options for handling the contact, wherein the selectable list of options comprises a transfer option, a connect via chat option, and a connect via call option; and receiving, from the graphical user interface, an option selection from the selectable list of options.

16. The non-transitory, computer-readable memory of claim 15, wherein the set of instructions comprises further instructions which, when executed by the processor, causes the processor to provide a co-browsing preview of a queued contact by:

handling the contact based on the received option selection.

17. The non-transitory, computer-readable memory of claim 16, wherein the option selection is the connect via chat option and wherein handling the contact further comprises:

in response to receiving the selection of the connect via chat option, initiating a chat session between the customer and the selected agent in the second region of the graphical user interface.

18. The non-transitory, computer-readable memory of claim 16, wherein the option selection is the transfer option and wherein handling the contact further comprises:

receiving a selection of a transfer agent, the transfer agent being selected from the plurality of agents other than the selected agent; and in response to receiving the selection of the transfer option and the selection of the transfer agent, assigning the contact to a queue of the transfer agent.

19. The non-transitory, computer-readable memory of claim 16, wherein the option selection is the connect via call option and wherein handling the contact further comprises:

in response to receiving the selection of the connect via call option, further determining whether Voice over Internet Protocol ("VoIP") calling is available to the customer, in response to determining VoIP calling is available to the customer, indicating a waiting state to the selected agent, inviting the customer to participate in a VoIP call, and in response to the invitation being accepted, initiating the VoIP call between the customer and the selected agent while maintaining the co-browsing preview.

20. The non-transitory, computer-readable memory of claim 16, wherein the selectable list of options further comprises a video call option and wherein the option selection is the video call option and wherein handling the contact further comprises:

in response to receiving the selection of the video call option, further determining whether video calling is available to the customer, in response to determining video calling is available to the customer, indicating a waiting state to the selected agent, inviting the customer to participate in a video call, and in response to the invitation being accepted, initiating the video call between the customer and the selected agent while maintaining the co-browsing preview.

\* \* \* \* \*

UNITED STATES PATENT AND TRADEMARK OFFICE
CERTIFICATE OF CORRECTION

PATENT NO. : 9,967,399 B2
APPLICATION NO. : 14/851268
DATED : May 8, 2018
INVENTOR(S) : Khalatian et al.

It is certified that error appears in the above-identified patent and that said Letters Patent is hereby corrected as shown below:

On the Title Page

[*] Notice, Line 3, after "0 days." delete "days.".

Signed and Sealed this
Sixth Day of November, 2018

Andrei Iancu
*Director of the United States Patent and Trademark Office*